US010989821B2

(12) United States Patent
Shutler et al.

(10) Patent No.: US 10,989,821 B2
(45) Date of Patent: Apr. 27, 2021

(54) SINGER PRODUCT APERTURES

(71) Applicants: NANYANG TECHNOLOGICAL UNIVERSITY, Singapore (SG); AUCKLAND UNIVERSITY OF TECHNOLOGY, Auckland (NZ)

(72) Inventors: Paul M. E. Shutler, Singapore (SG); Kevin Byard, Auckland (NZ)

(73) Assignees: Nanyang Technological University, Singapore (SG); Auckland University of Technology, Auckland (NZ)

(*) Notice: Subject to any disclaimer, the term of this patent is extended or adjusted under 35 U.S.C. 154(b) by 0 days.

(21) Appl. No.: 16/468,662

(22) PCT Filed: Dec. 14, 2017

(86) PCT No.: PCT/SG2017/050619
§ 371 (c)(1),
(2) Date: Jun. 11, 2019

(87) PCT Pub. No.: WO2018/111192
PCT Pub. Date: Jun. 21, 2018

(65) Prior Publication Data
US 2020/0081142 A1    Mar. 12, 2020

(30) Foreign Application Priority Data
Dec. 14, 2016 (SG) ............. 10201610496W

(51) Int. Cl.
*G01T 1/16* (2006.01)
*G01T 1/29* (2006.01)
(Continued)

(52) U.S. Cl.
CPC ............. *G01T 1/295* (2013.01); *G01N 23/04* (2013.01); *G06K 9/209* (2013.01)

(58) Field of Classification Search
CPC .......... G01T 1/295; G01T 1/29; G06K 9/209; G01N 23/04; G06T 11/003; G06T 5/001;
(Continued)

(56) References Cited

U.S. PATENT DOCUMENTS 4,389,633 A   6/1983 Fenimore
5,036,546 A * 7/1991 Gottesman ............. G01T 1/295
                                                  382/275
(Continued)

FOREIGN PATENT DOCUMENTS

CN    102890974 A    1/2013

OTHER PUBLICATIONS

Cieslak et al. "Coded-aperture imaging systems: Past, present and future development-A review", Elsevier, Radiation Measurements 92, Aug. 3, 2016, p. 59-71. (Year: 2016).*
(Continued)

*Primary Examiner* — David P Porta
*Assistant Examiner* — Mamadou Faye
(74) *Attorney, Agent, or Firm* — Seed Intellectual Property Law Group LLP

(57) ABSTRACT

A coded aperture mask is provided. The coded aperture mask may include a 2-D planar substrate having a plurality of holes constructed based on a Cartesian product of a first 1-D aperture set and a second 1-D aperture set. The first 1-D aperture set may have a first balanced decoder. The second 1-D aperture set may have a second balanced decoder. The Cartesian product may involve the first 1-D aperture set and the second 1-D aperture set arranged in a non-zero angle (e.g., 90 degrees) to each other. The first 1-D aperture set may define a first axis of the 2-D planar substrate. The second 1-D aperture set may define a second axis of the 2-D planar substrate. The plurality of holes on the 2-D planar
(Continued)

substrate may correspond to holes in both of the first 1-D aperture set and the second 1-D aperture set.

18 Claims, 20 Drawing Sheets

(51) Int. Cl.
  *G01N 23/04* (2018.01)
  *G06K 9/20* (2006.01)
(58) Field of Classification Search
  CPC ... H04N 5/2253; H04N 5/2254; H04N 13/204
  See application file for complete search history.

(56) References Cited

U.S. PATENT DOCUMENTS

| | | | |
|---|---|---|---|
| 5,606,165 A | 2/1997 | Chiou et al. | |
| 2002/0075990 A1 | 6/2002 | Lanza et al. | |
| 2006/0261278 A1* | 11/2006 | Accorsi | G01T 1/2985 250/363.06 |
| 2015/0139560 A1* | 5/2015 | DeWeert | H04N 19/42 382/233 |

OTHER PUBLICATIONS

Accorsi et al., "Optimal coded aperture patterns for improved SNR in nuclear medicine imaging", *Nuclear Instruments and Methods in Physics Research*, A 474 (2001), pp. 273-284.
"Area Around Reactor Buildings: Robots Used for Surveys", *TEPCO*, retrieved Jul. 17, 2019 from <https://www7.tepco.co.jp/responsibility/decommissioning/robot/inbuildings-e.html>.
Asif et al., "FlatCam: Thin, Bare-Sensor Cameras using Coded Aperture and Computation", Department of Electrical and Computer Engineering, Rice University, Jan. 2016, <https://arxiv.org/pdf/1509.00116v2>, 12 pages.
Baumert, L., *Lecture Notes in Mathematics: a collection of informal reports and seminars*, California Institute of Technology, Springer-Verlag, 1971, 171 pages.
Brown, C., "Multiplex imagine with multiple-pinhole cameras", *Journal of Applied Physics*, vol. 45(4), Apr. 1974, pp. 1806-1811.
Byard, "On self-supporting coded aperture arrays", *Nuclear Instruments and Methods in Physics Research*, A 322 (1992), pp. 97-100.
Byard, "Synthesis of binary arrays with perfect correlation properties—coded aperture imaging", *Nuclear Instruments and Methods in Physics Research*, A 336 (1993), pp. 262-268.
Byard, "Fast decoding algorithms for coded aperture systems", *Nuclear Instruments and Methods in Physics Research*, A 754 (2014), pp. 36-41.
Byard, "Fast decoding algorithms for geometric coded apertures", *Nuclear Instruments and Methods in Physics Research*, A 803 (2015), pp. 1-3.
Byard, "Application of fast cross-correlation algorithms", *Electronics Letters*, vol. 51(3), Feb. 5, 2015, pp. 242-244.
Byard, et al., "Singer product apertures—A coded aperture system with a fast decoding algorithm", *Nuclear Instruments and Methods in Physics Research*, A 856 (2017), pp. 147-153.
Byard, K., "Square Element Antisymmetric Coded Apertures", *Experimental Astronomy*, vol. 2, 1992, pp. 227-232, 6 pages.
Calabro et al., "On the Synthesis of Two-Dimensional Arrays with Desirable Correlation Properties", *Information and Control*, vol. 11, 1968, pp. 537-560.
Caroli, et al., "Coded Aperture Imagine in X- and Gamma-Ray Astronomy", *Space Science Reviews*, vol. 45, 1987, pp. 349-403.
"Crypix Detector: Hybrid Pixel Imagine Detector", *Cytur*, <www.crytur.cz/products/crypix-detector/>, 4 pages.
Dicke, R.H., "Scatter-Hole Cameras for X-Rays and Gamma Rays", *The Astrophysical Journal*, vol. 153, Aug. 1968, pp. L101-106.

"Fast Fourier transform", *Wikipedia*, retrieved from <http://en.wikipedia.org/wiki/Fast Fourier transform> on Jul. 17, 2019, 8 pages.
Faust, A., "Detection of Explosive Devices using X-ray Backscatter radiation", *Proceedings of SPIE*, vol. 4786 (2002), pp. 17-28.
Faust, et al., "Development of a Coded Aperture X-Ray Backscatter Imager for Explosive Device Detection", *IEEE Transactions on Nuclear Science*, vol. 56(1), Feb. 2009, pp. 299-307.
Fenimore, E.E.., "Coded aperture imaging: predicted performance of uniformly redundant arrays", *Applied Optics*, vol. 17(22), Nov. 15, 1978, pp. 3562-3570.
Finger, et al., "Hexagonal Uniformly Redundant Arrays for Coded-Aperture Imaging", *Proceeding of the 19th International Cosmic Ray Conference*, 3, 1985, pp. 295-298.
"Flicker fusion threshold", *Wikipedia*, retrieved from <http://en.wikipedia.org/wiki/Flicker fusion threshold>, on Jul. 17, 2019, 4 pages.
"Frame Rate", *Wikipedia*, retrieved from <http://en.wikipedia.org/wiki/Frame rate> on Jul. 17, 2019, 3 pages.
Gottesman, et al., "New family of binary arrays for coded aperture imaging", Applied Optics, vol. 28(20), Oct. 15, 1989, pp. 4344-4352.
Gottesman et al., "PNP—A new Class of Coded Aperture Arrays", *IEEE Transactions on Nuclear Science*, vol. 33(1), Feb. 1986, pp. 745-749.
Gourlay, et al., "Geometric coded aperture masks", *Applied Optics*, vol. 22(24), Dec. 15, 1983, pp. 4042-4047.
"Graphics processing unit", Wikipedia, retrieved from <http://en.wikipedia.org/wiki/Graphics processing unit#Applications> on Jul. 17, 2019, 9 pages.
Gunson, "Optimum Design of a Coded Mask X-Ray Telescope for Rocket Applications", *Monthly Notices of the Royal Astronomical Society.*, vol. 177, 1976, pp. 485-497.
Horn et al., "Dynamic Reconstruction", *IEEE Transactions on Nuclear Science*, vol. 57(1), Feb. 2010, pp. 193-205.
"Linking Strategy, Implementation and People: Book of Abstracts, Presentations, and Papers", Symposium of International Safeguards, Oct. 20-24, 2014, Vienna, Austria, 503 pages.
"List of Nvidia graphics processing units", *Wikipedia*, retrieved from <http://en.wikipedia.org/wiki/List of Nvidia graphics processing units> on Jul. 17, 2019, 77 pages.
Luke, H., "Sequences and Arrays with Perfect Periodic Correlation", *IEEE Transactions on Aerospace and Electronic Systems*, vol. 24(3), May 1988, pp. 287-294.
Mertz et al., "Fresnel Transformations of Images", *Proceedings of the International Conference on Optical Instruments and Techniques*, 1961, pp. 305-310.
Miyamoto, S., "Hadamard Transform X-Ray Telescope", *Space Science Instrumentation*, 3, 1977, pp. 473-481.
"Nuclear medicine", *Wikipedia*, retrieved from <http://en.wikipedia.org/wiki/Nuclear medicine>, on Jul. 17, 2019, 7 pages.
Peterson et al., *Error-Correcting Codes—*, $2^{nd}$ edition, The MIT Press, 1972, pp. 116-181.
"RMD RadCam", RMD Instruments Corp., <http://rmdinc.com/radcam/>, Jun. 2010, 2 pages.
Rogers et al., "Coded-Aperture Imaging of the Heart", *The Journal of Nuclear Medicine*, vol. 21, 1980, pp. 371-378.
Rogues, J.P., "Fast decoding algorithm for uniformly redundant arrays", *Applied Optics*, vol. 26(18), Sep. 15, 1987, pp. 3862-3865.
Shutler et al., "Signal-to-noise ratio in coded aperture imaging", *Nuclear Instruments and Methods in Physics Research*, A 669 (2012), pp. 22-31.
Shutler et al., "Mask design and fabrication in coded aperture imaging", *Nuclear Instruments and Methods in Physics Research*, A 709 (2013), pp. 129-142.
Shutler et al., "Periodic wrappings in coded aperture imaging", *Nuclear Instruments and Methods in Physics Research*, A 738 (2014), pp. 132-148.
Singer, J., "A theorem in finite projective geometry and some applications to number theory", *Transactions of the American Math Society*, vol. 43, 1938, pp. 377-385.

(56) References Cited

OTHER PUBLICATIONS

Slinger et al., "Coded aperture systems as nonconventional, lensless imagers for the visible and infrared", *Proceedings of SPIE*, vol. 6737, 2007, 10 pages.
Stoylen, et al., "Strain Rate Imaging by Ultrasonography in the Diagnosis of Coronary Artery Disease", *Journal of the American Society of Echocardiography*, vol. 11, Dec. 2000, pp. 1053-1064; and honors thesis.
Woodring, et al., "Advanced multi-dimensional imaging of gamma-ray radiation", *Nuclear Instruments and Methods in Physics Research*, A 505 (2003), pp. 415-419.

* cited by examiner

SINGER PRODUCT APERTURES

CROSS-REFERENCE TO RELATED APPLICATION(S)

This application claims the benefit of Singapore Patent Application No. 10201610496W, entitled "SINGER PRODUCT APERTURE" and filed on Dec. 14, 2016, which is expressly incorporated by reference herein in its entirety.

TECHNICAL FIELD

Various aspects of this disclosure generally relate to coded aperture imaging, and more particularly, to Singer product apertures.

BACKGROUND

Coded aperture imaging (CAI) is useful when the incoming radiation (e.g. photons or charged particles) is of such high energy that it cannot be focused by a conventional lens. FIG. 1 is a diagram 100 illustrating an example of traditional photography. In the example, light from an object 102 is focussed by a lens 104 to form an image 108 on a film 106 of photographic emulsion, which is then developed by a chemical process (at 110) to produce the final printed image 112.

FIG. 2 is a diagram 200 illustrating an example of coded aperture imaging. In the example, radiation from an object 202 passes through a coded aperture 204, usually a sheet of metal (may be referred to as flat planar substrate) with holes drilled according to a special pattern (hence forming a coded aperture mask where only the holes allow radiation to pass through), to form multiple overlapping pinhole images on a detector 206. Due to the special pattern of the holes on the coded aperture 204, however, this apparently blurry jumble of images can in fact be processed on a computer 208 by means of a decoding algorithm to form a clear decoded image 210.

In traditional photography, the size of aperture is an important parameter which influences image quality. For CAI, there is an equally important corresponding parameter called the open fraction or throughput, represented by the symbol p. This can be defined in several different ways, for example as follows:

$$\rho = \frac{\text{number of holes}}{\text{total number of pixels}}.$$

Because the different definitions do not exactly agree numerically, p may be rounded to the nearest whole reciprocal e.g. $\rho=\frac{1}{2}$, $\frac{1}{3}$, $\frac{1}{4}$, . . . . Thus the open fraction can loosely be thought of as the fraction of the area of the coded aperture 204 that is "open", i.e., consists of holes. If there are too many holes, then the multiple pinhole images on the detector 206 may overlap with each other to too great an extent, causing the signal-to-noise ratio (SNR) to deteriorate. Conversely, if there are too few holes, then the pinhole images will not overlap at all, meaning parts of the detector 206 are left unutilized, and again the SNR will go down. There is therefore an optimal open fraction denoted by $\rho_{opt}$ which depends upon the size of the object 202 being imaged. If the object 202 appears small, then many copies can be packed onto the detector 206, so there can be many holes, and $\rho_{opt}$ may be large. If the object 202 appears large, then few copies can be packed onto the detector 206, so there cannot be too many holes, and $\rho_{opt}$ may be small. Although CAI was first applied to objects which appeared very small, e.g. point sources, in which case the optimal open fraction was large, more recently objects are being imaged which take up a progressively larger fraction of the field of view. Therefore, coded apertures with progressively smaller open fractions are desirable.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a coded aperture mask is provided. The coded aperture mask may include a 2-dimensional (2D or 2-D) planar substrate having a plurality of holes constructed based on a Cartesian product of a first 1-dimensional (1D or 1-D) aperture set and a second 1-D aperture set. The first 1-D aperture set may have a first balanced decoder. The second 1-D aperture set may have a second balanced decoder. The Cartesian product may involve the first 1-D aperture set and the second 1-D aperture set arranged in a non-zero angle to each other. The first 1-D aperture set may define a first axis of the 2-D planar substrate. The second 1-D aperture set may define a second axis of the 2-D planar substrate. The plurality of holes on the 2-D planar substrate may correspond to holes in both of the first 1-D aperture set and the second 1-D aperture set.

In another aspect of the disclosure, a method, an apparatus, and a computer-readable medium for coded aperture imaging are provided. The apparatus may receive an image formed on a detector by radiation passed through a coded aperture mask. The image may include a plurality of rows and a plurality of columns. The coded aperture mask may include a 2-D planar substrate having a plurality of holes constructed based on a Cartesian product of a first 1-D aperture set and a second 1-D aperture set. The first 1-D aperture set may have a first balanced decoder. The second 1-D aperture set may have a second balanced decoder. The apparatus may decode the image based on the first 1-D aperture set and the second 1-D aperture set.

In some embodiments, to decode the image, the apparatus may apply the first balanced decoder to one of the plurality of rows or the plurality of columns, and apply the second balanced decoder to the other of the plurality of rows or the plurality of columns. In some embodiments, to decode the image, the apparatus may apply the first 1-D aperture set as a first direct decoder to one of the plurality of rows or the plurality of columns, and apply the second 1-D aperture set as a second direct decoder to the other of the plurality of rows or the plurality of columns to obtain an intermediate decoded image. The apparatus may adjust image pixel brightness of the intermediate decoded image by adding or subtracting from each pixel value a first multiple of a first sum on a first dimension (row or column sum) of the intermediate decoded image corresponding to the pixel value, a second multiple of a second sum on a second dimension (row or column sum) of the intermediate decoded image corresponding to the pixel value, and a third multiple of the total number of tracks on the detector.

In yet another aspect of the disclosure, a method, an apparatus, and a computer-readable medium for coded aperture imaging are provided. The apparatus may determine the number of pixels in an object being imaged. The apparatus may calculate a target open fraction based on the number of pixels. The apparatus may select a coded aperture mask for imaging the object based on the target open fraction. The apparatus may image the object using the coded aperture mask.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
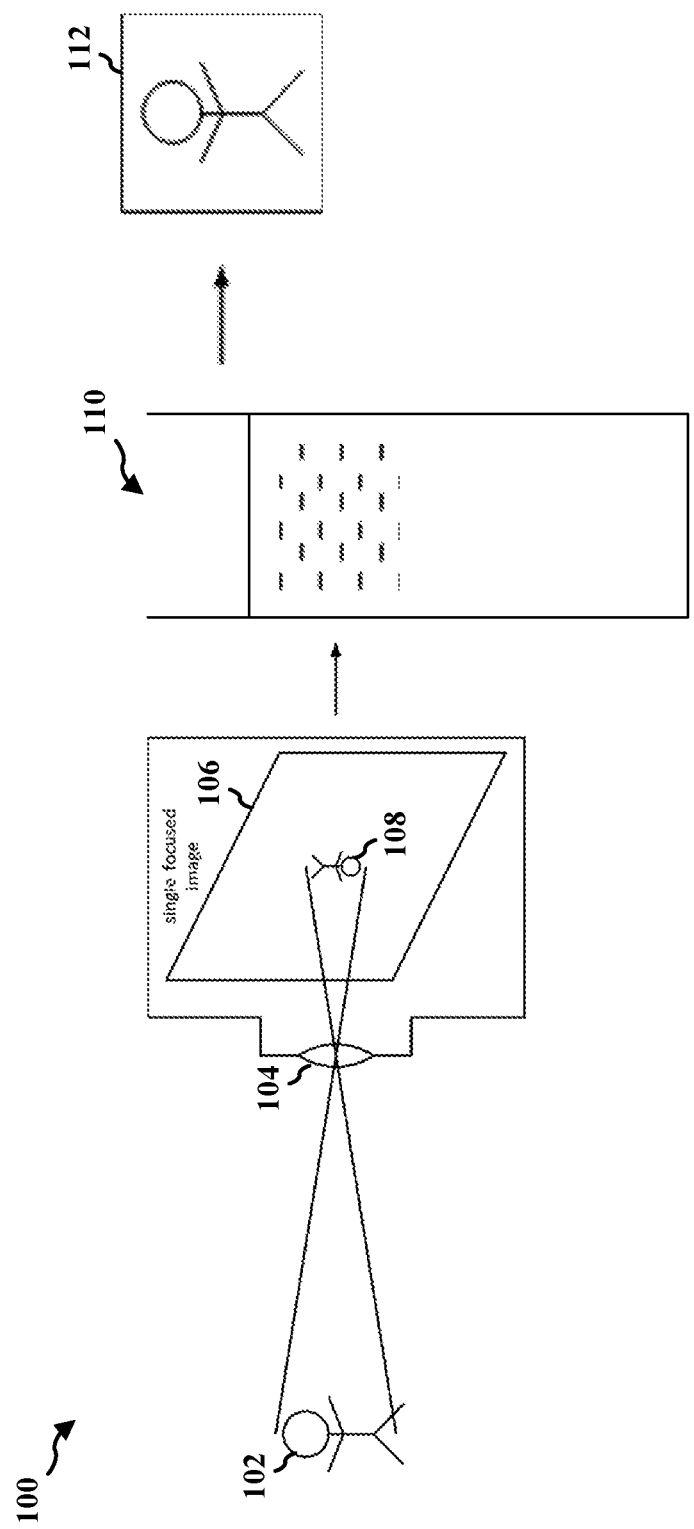
FIG. 1 is a diagram illustrating an example of traditional photography.
Figure 2:
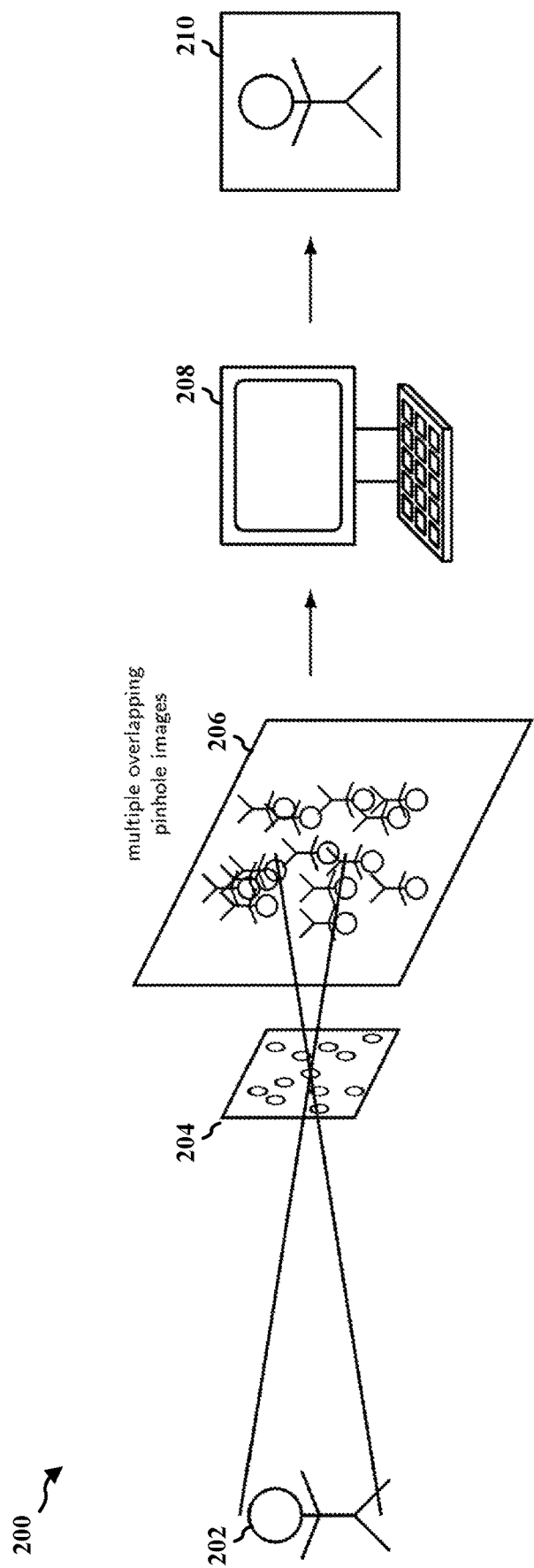
FIG. 2 is a diagram illustrating an example of coded aperture imaging.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of coded aperture imaging will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media may include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Figure 3:
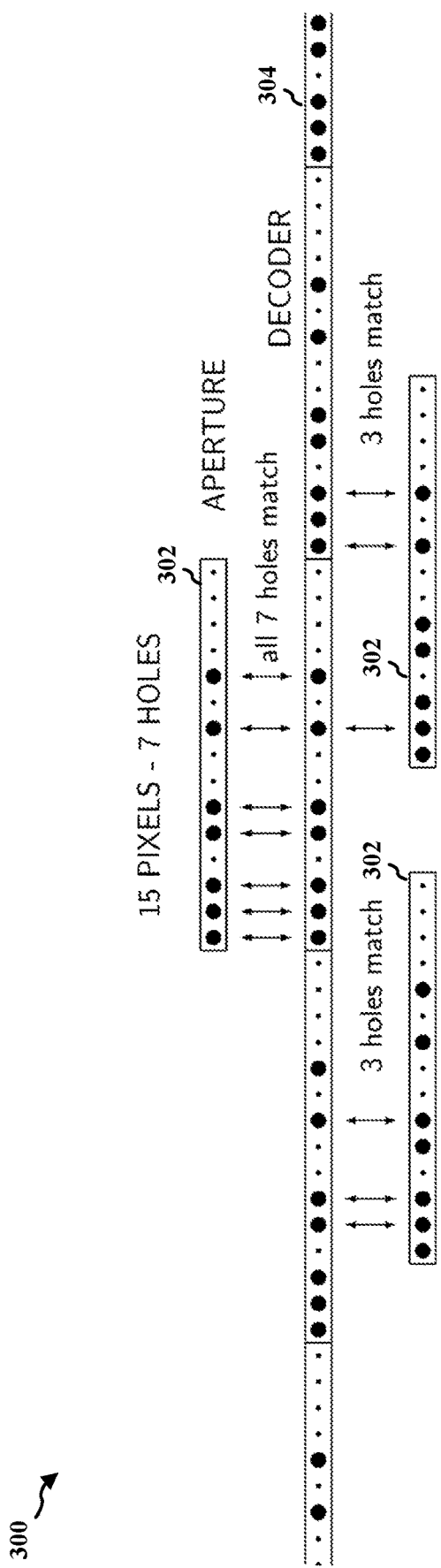
FIG. 3 is a diagram illustrating an example of cyclic difference sets.

FIG. 3 is a diagram 300 illustrating an example of cyclic difference sets. Most coded apertures are based on cyclic difference sets (CDS) which being 1-dimensional are best thought of as strips of tickertape into which holes have been cut according to a certain pattern. In the example, a coded aperture 302 has 15 pixels of which 7 are holes. A decoder 304 is many copies of the coded aperture 302 joined end to end. When the aperture 302 and the decoder 304 are aligned, all 7 holes match. The key property which makes the pattern a CDS is that for all possible misalignments of the aperture 302 with the decoder 304, the number of holes which match (may be referred to as sidelobe) happens always to be the same, and in the case of the example shown in FIG. 3, it is always 3 holes.

Figure 4:
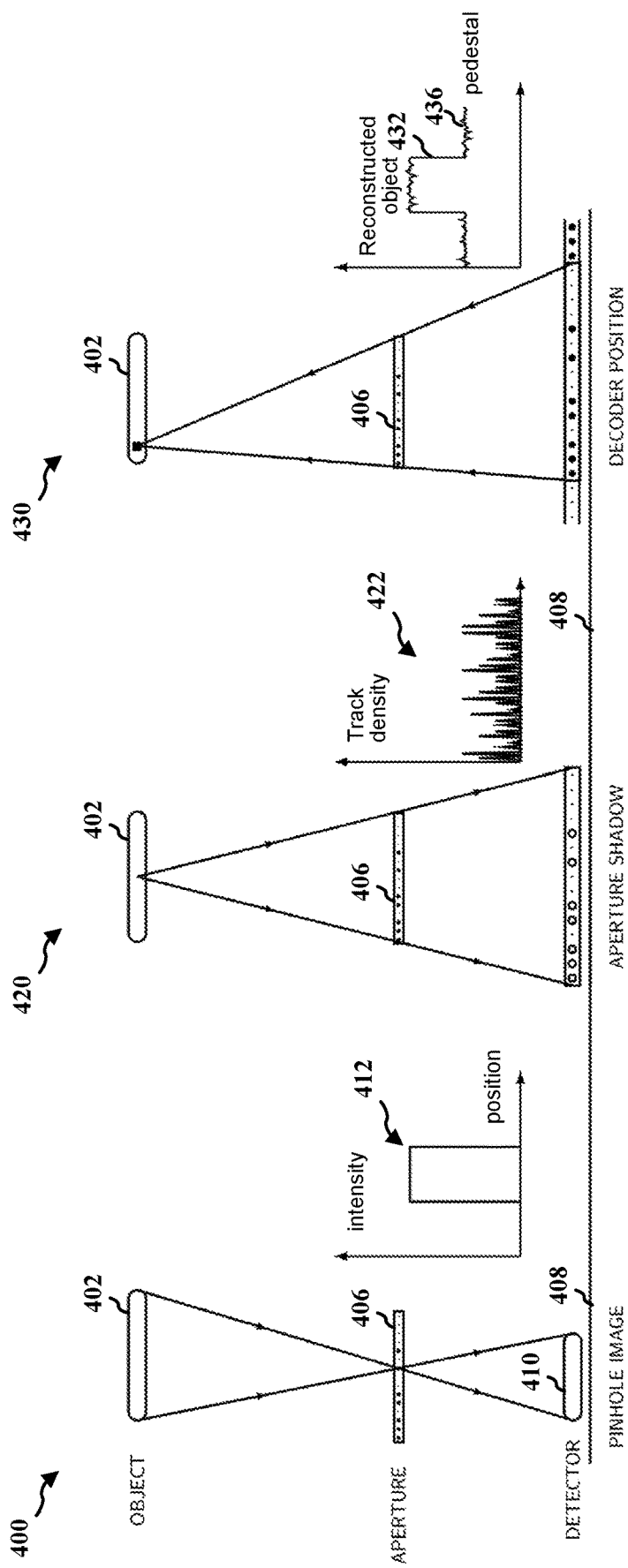
FIG. 4 are diagrams illustrating an example of coded aperture imaging in 1-dimension.

FIG. 4 are diagrams illustrating an example of coded aperture imaging in 1-dimension. In the example, photons or particles emitted by an object 402 pass through the holes of an aperture 406, and the position where each strikes the detector 408 is marked as a "track". As shown in diagram 400, each hole separately would produce a pinhole image 410 of the object 402. The intensities of the pinhole image 410 at different positions is shown in chart 412. As shown in diagram 420, when pinhole images produced by all the holes of the aperture 406 are combined, the result is an apparently blurry mess. The track density of the combined pinhole image is shown in chart 422.

As shown in diagram 430, the simplest way to decode, called direct decoding, is to pass the decoder across the detector 408 and count the number of tracks visible through the holes. For each possible position of the decoder, this count will include all of the tracks from the object pixel whose aperture shadow matches the current position of the decoder, plus a fraction of the tracks from all the other object pixels due to the matching holes, as in FIG. 3. Because this number of matching holes is a constant, this fraction of the other object pixel tracks will also be constant, which means that the reconstructed image 432 of the object 402 will be superimposed on a constant brightness background, called the 'pedestal' 436, which is then subtracted to reveal the final image. Alternatively, one can replace the holes/non-holes of the decoder with certain positive/negative constants, whose values are adjusted so that the cyclic correlation sidelobes are zero, i.e. for all possible misalignments, the positive and negative values added up over the holes of the aperture sum to zero. When this alternative decoder is passed over the detector and the numbers of tracks in each pixel are added up but weighted according to these positive/negative values, the pedestal which previously had to be subtracted is now automatically zero, which is why this is called a balanced decoder.

The various families of CDS may be classified according to the value of their open fraction p. Half open CDS are CDS whose open fraction $\rho$ is ½. There are many families of half open CDS, e.g., quadratic residue sets, pseudonoise sets, m-sequences, and certain Singer sets. Since the numbers of holes and non-holes are almost equal, the balanced decoder often consists of ±1's. For example, aperture [0, 0, 0, 1, 0, 0, 1, 1, 0, 1, 0, 1, 1, 1, 1] has balanced decoder {−1, −1, −1, +1, −1, −1, +1, +1, −1, +1, −1, +1, +1, +1, +1}. In cases such as this, when all the entries have modulus one, i.e. 1±1|=1, the decoder is called unimodular.

Less than half open CDS are CDS whose open fraction $\rho$ is less than ½. With a few exceptions, there is only one family, the Singer sets that are half open CDS. Singer sets come in many different sizes, and open fractions $\rho=1/q$, where q is any prime number, or the power of a prime number (e.g., q=2, 3, 4, 5, 7, 8, 9, 11, 13, 16, 17, 19, 23, 25, 27, . . . . Therefore, there are plenty of choices, and one can almost always find a Singer set that is close to $\rho_{opt}$ in a given circumstance. The less than half open CDS may have balanced decoders. Because the numbers of holes/non-holes are unequal, the balanced decoders are not unimodular. For example, the $\rho=\frac{1}{3}$ aperture [1, 1, 0, 1, 0, 0, 0, 0, 0, 1, 0, 0, 0] has balanced decoder {+¾, +¾, −¼, +¾, −¼, −¼, −¼, −¼, −¼, +¾, −¼, −¼, −¼}.

Figure 5:
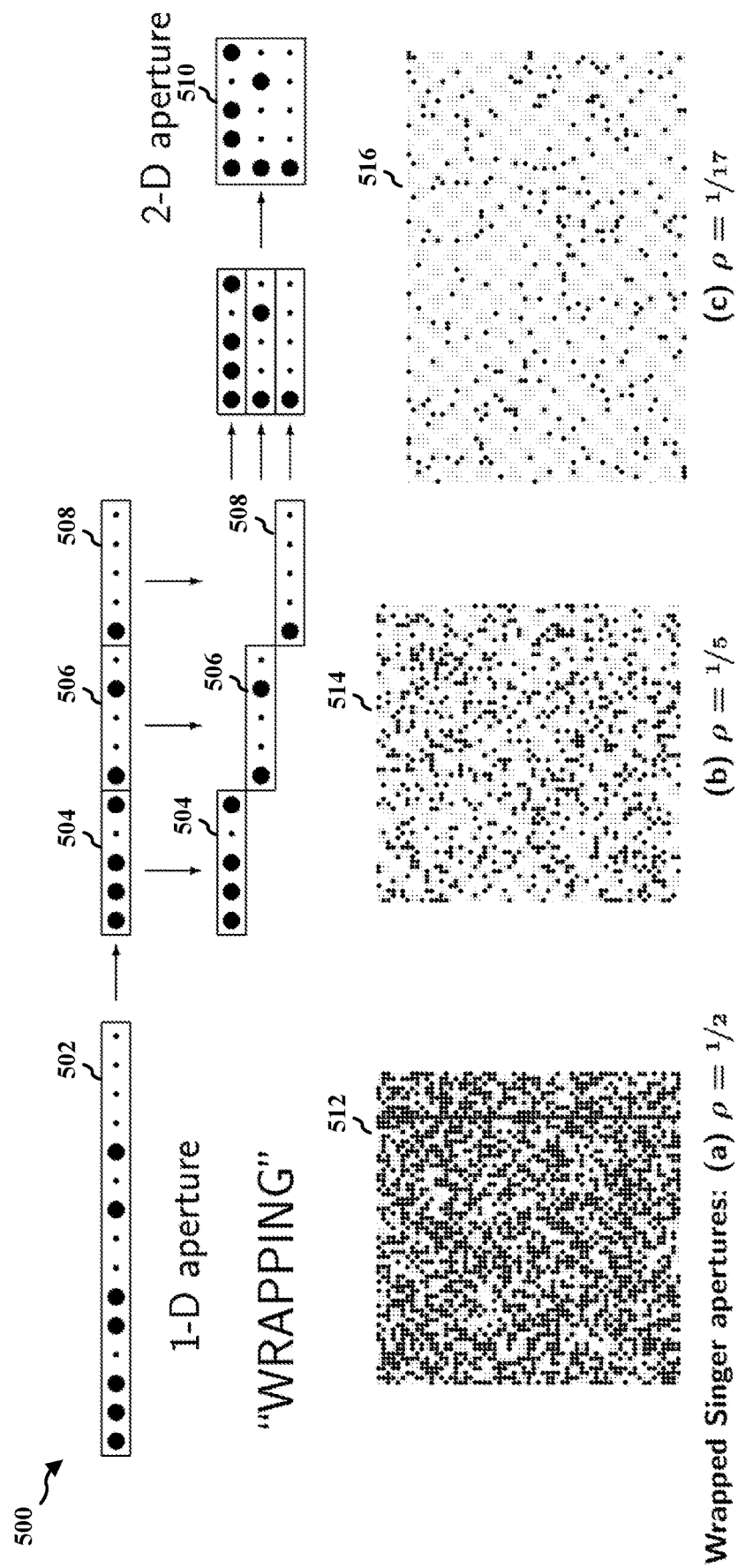
FIG. 5 is a diagram illustrating examples of wrapping a 1-dimensional aperture into a 2-dimensional aperture.

FIG. 5 is a diagram 500 illustrating examples of wrapping a 1-dimensional aperture into a 2-dimensional aperture. The 1-dimensional coded aperture imaging system described above in FIGS. 3 and 4 may be converted into a 2-dimensional imaging system. One way to do this is to cut the tickertape of the 1-D aperture 502 into segments of equal lengths (e.g., segments 504, 506, 508), then stack these segments vertically, in exactly the same way that an old fashioned tickertape used to be cut up and pasted into a readable telegram paragraph. The result is a 2-D aperture 510. This process is called wrapping or folding the 1-dimensional aperture 502 into 2-dimensions. The three examples of 2-D apertures 512, 514, 516 are constructed from Singer sets with different open fractions as indicated. Their visual appearance is that of a random scatter of holes, but where the density of the holes $\rho=1/q$ can be made as small as one may like by increasing the value of q.

Figure 6:
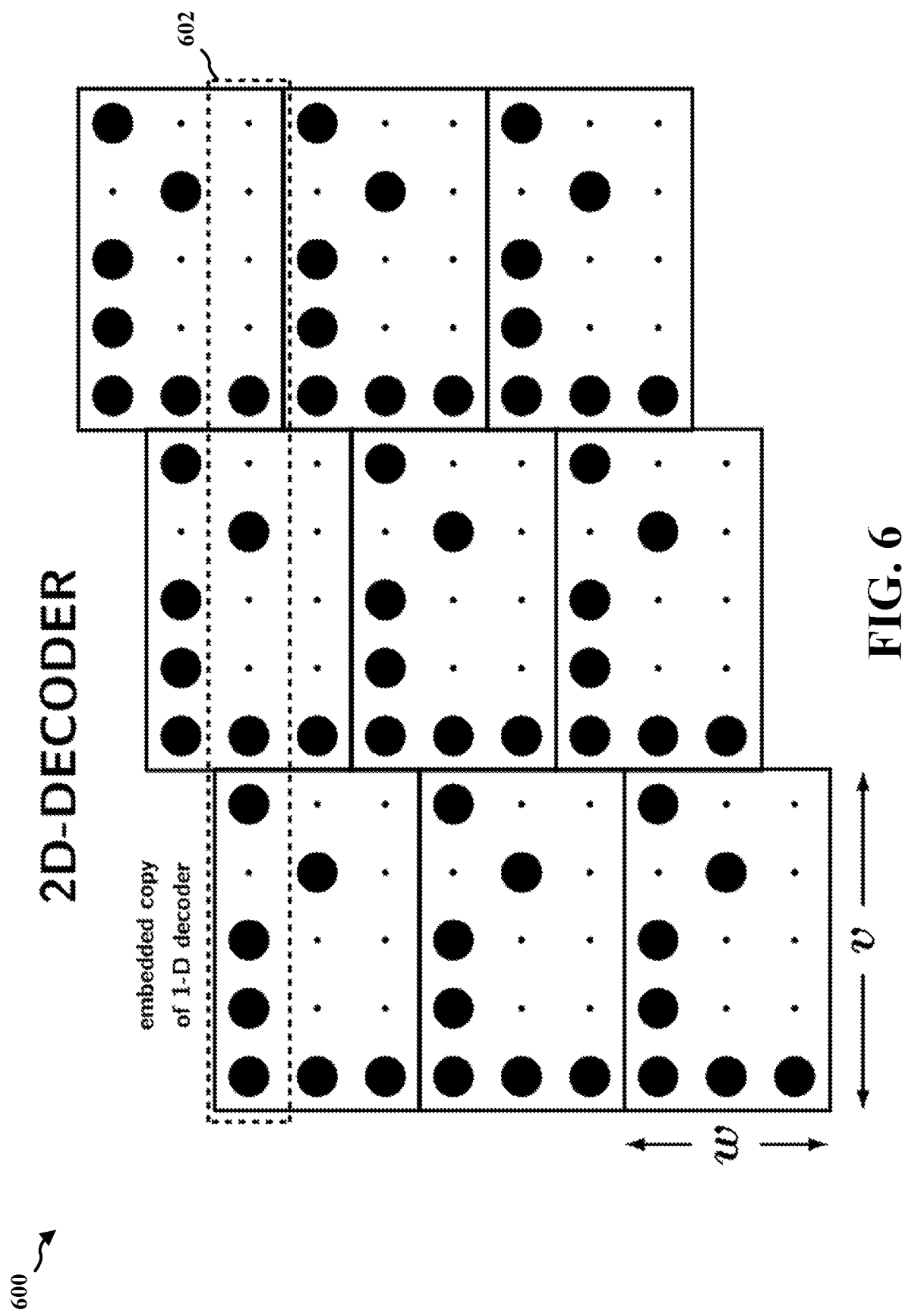
FIG. 6 is a diagram illustrating an example of 2-dimensional decoder for a wrapped coded aperture described above in FIG. 5.

FIG. 6 is a diagram illustrating an example of 2-dimensional decoder 600 for a wrapped coded aperture described above in FIG. 5. A wrapped coded aperture may be decoded in essentially the same way as the 1-D system described above with reference to FIGS. 3 and 4, except that instead of joining copies of the tickertape end to end, copies of the 2-D aperture are joined edge to edge. More precisely, many copies of the 2-D aperture 510 may be tiled or tessellated, which works because there are copies of the 1-D decoder 602 embedded within it. This 2-D decoder 600 may be passed across the detector, but in both the x- and y-directions, and at each position the tracks visible through the holes are counted. As in the 1-D system, the object pixel being decoded is the one which casts an aperture shadow matching one copy of the aperture within the decoder.

The main advantage of wrapping a 1-D coded aperture into a 2-D aperture is the high quality of the images obtained. This is because wrapping works for any CDS, including all Singer sets, so by adjusting the open fraction $\rho=1/q$ to be close to the optimal open fraction $\rho_{opt}$ for the object being imaged, a high SNR may be obtained. If m is the number of pixels in the reconstructed image occupied by the object, then the optimal open fraction may be computed using the formula $\rho_{opt}=1/(1+\sqrt{m})$, which shows that as m increases, $\rho_{opt}$ tends to zero. The main disadvantage of conventionally wrapped 2-D coded apertures is that they can be very slow to decode. Suppose that the coded aperture is v pixels wide by w pixels tall. To decode each pixel, one may need to add up the tracks visible through the holes, which may mean summing over all v×w pixels. This may need to be repeated for each of the v×w pixels in the image. This means that (v×w)×(v×w) or $v^2w^2$ steps may be needed in the algorithm, which can be very large. For example, decoding a 64×64 pixel image on a 3 GHz desktop computer may take about 0.5 seconds, a 256×256 pixel image may take about 3 minutes, and a 1M pixel image may take about 10 hours. This means that conventionally wrapped apertures may only produce a sequence of still images, not video.

In some embodiments, 1-D apertures may be turned into 2-D apertures by forming their Cartesian product. This means laying two 1-D coded apertures at right angles, then placing a hole in each pixel of the product aperture precisely when its row and column correspond to holes in both of the 1-D apertures. The number of holes in the product aperture is then the product of the number of the holes in the two 1-D apertures, so if their open fractions are $\rho$ and $\sigma$, the open fraction of the product aperture is $\rho \times \sigma$.

Figure 7:
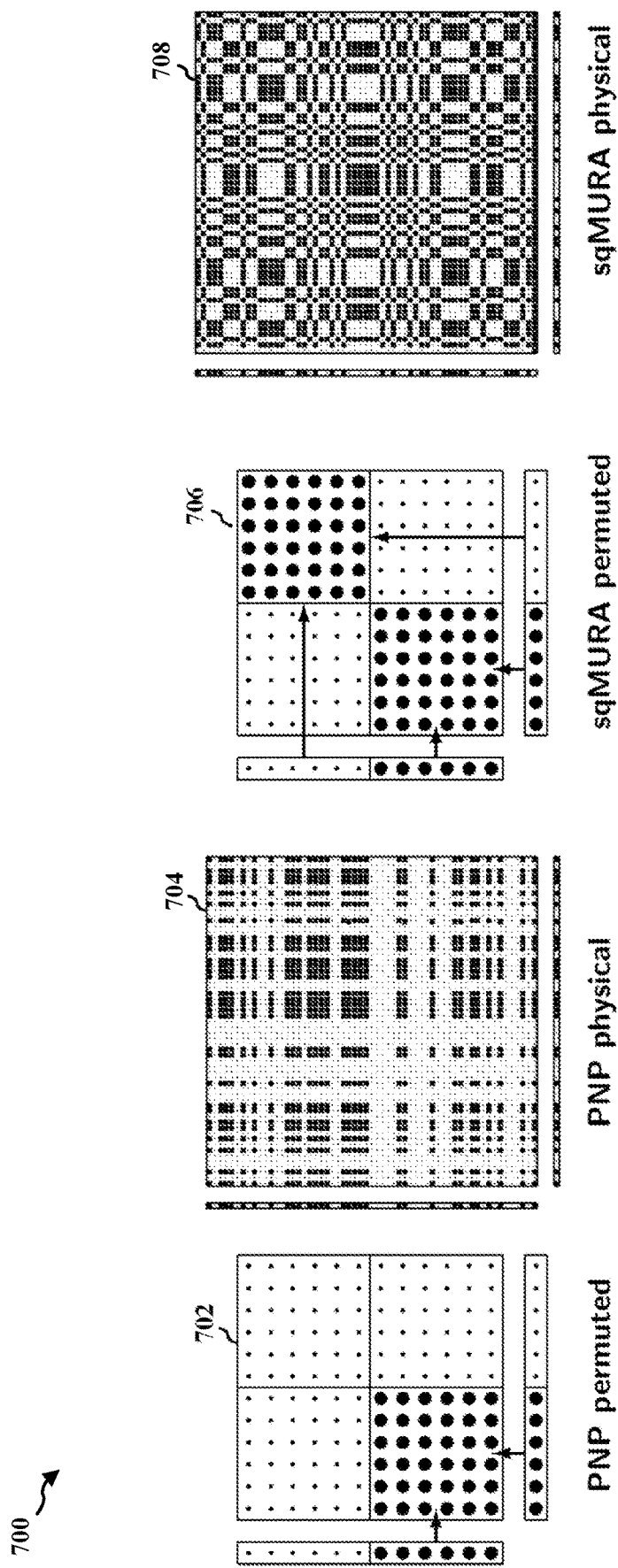
FIG. 7 is a diagram illustrating some examples of 2-dimensional apertures formed by Cartesian product of 1-dimensional apertures.

FIG. 7 is a diagram 700 illustrating some examples of 2-dimensional apertures formed by Cartesian product of 1-dimensional apertures. The simplest type of 2-D aperture is called a pseudonoise-product, or PNP, where the example 702 has the order of the rows and columns permuted to bring the holes together in one block so as to show the product structure clearly, and the example 704 is a larger example shown as it physically exists. More sophisticated types include the square uniformly redundant array, or sqURA and square modified URA, or sq(M)URA, both of which double the number of holes by also putting a hole where both the two 1-D apertures do not have holes. The example 706 is a sq(M)URA having the order of the rows and columns permuted to bring the holes together in one block so as to show the product structure clearly, and the example 708 is a sq(M)URA shown as it physically exists.

Figure 8:
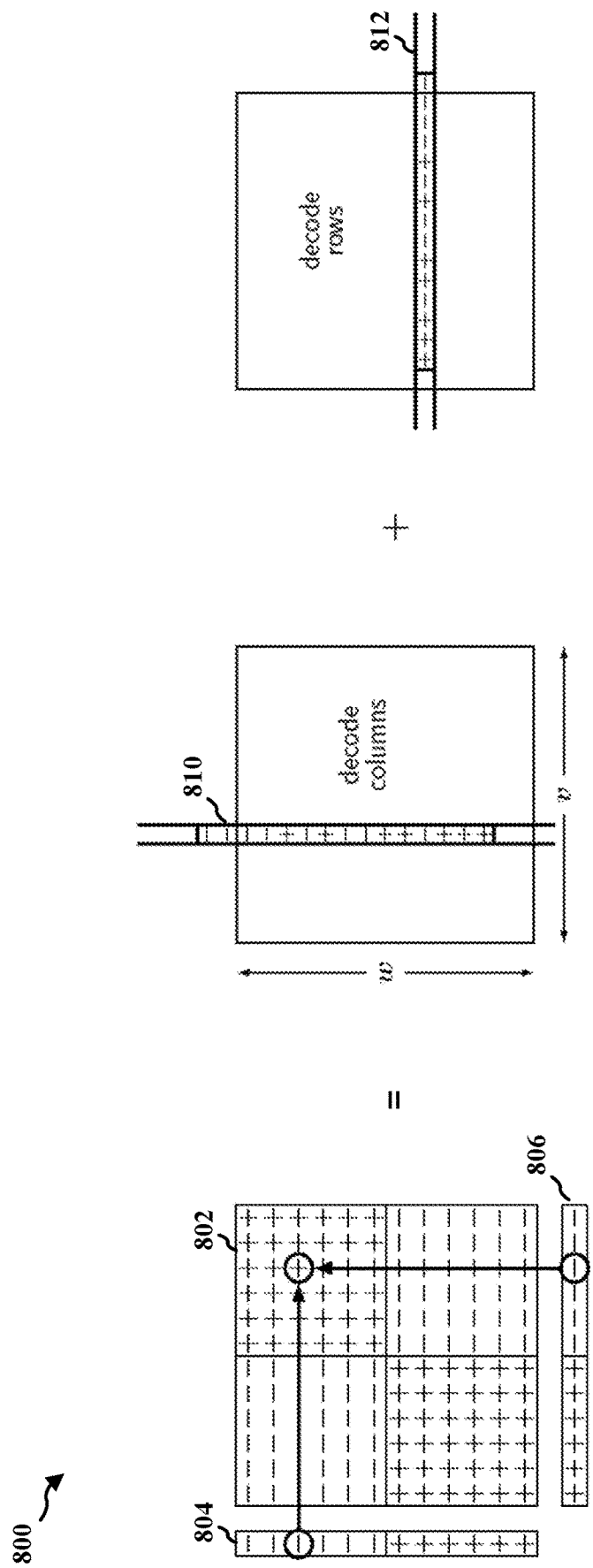
FIG. 8 is a diagram illustrating an example of decoding a 2-dimensional aperture described above in FIG. 7.

FIG. 8 is a diagram 800 illustrating an example of decoding a 2-dimensional aperture described above in FIG. 7. PNP's and sq(M)URA's may have essentially the same decoder 802, which is the Cartesian product of the unimodular balanced decoders of the 1-D apertures 804 and 806 (permuted), where each 2-D entry is the product of the corresponding 1-D entries, e.g. $(-1) \times (-1) = +1$ as indicated. The proof that sqURA's could be decoded this way was complicated, and depended on the unimodularity of the 1-D decoders. A proof for PNP's was restricted to only unimodular decoders. This may explain why this construction was never extended to 1-D apertures with open fractions $\rho, \sigma < \frac{1}{2}$, since these do not have unimodular decoders, but instead include fractional terms. The 2-D decoder 802 could be applied as it is, but that would be as slow as a wrapped aperture decoder, and faster alternatives exist. In some embodiments, the decoding could be accomplished instead using the 1-D unimodular decoders 810 and 812 to decode first the columns and then the rows. This is called fast decoding. The order of decoding columns and rows may be interchanged. For example, in some embodiments, the decoding could be accomplished using the 1-D unimodular decoders 812 and 810 to decode first the rows and then the columns.

The main advantage of product apertures is this ability to perform fast decoding. Using the same v×w example as described above in FIG. 6, decoding each column takes $w^2$ operations for each of the v columns, a total of $w^2 \times v$ operations. Then decoding each row takes $v^2$ operations for each of the w rows, a total of $v^2 \times w$ operations. Putting these two together, a total of only $w^2 v + v^2 w = vw(v+w)$ operations may be needed, which is a much smaller number than the $v^2 w^2$ for wrapped apertures. For example, decoding a 64×64 pixel image on a current 3 GHz desktop computer may take about 0.003 secs, a 256×256 pixel image would take about 0.1 secs, and a 1M pixel image about 3 secs. The main disadvantage of product apertures is their poor image quality. Their SNR may be high when imaging small objects if their open fractions are fixed at ½ or ¼, and are not lowered to match the much smaller optimal open fractions $\rho_{opt}$ which the modern trend towards imaging larger objects needs.

Figure 9:
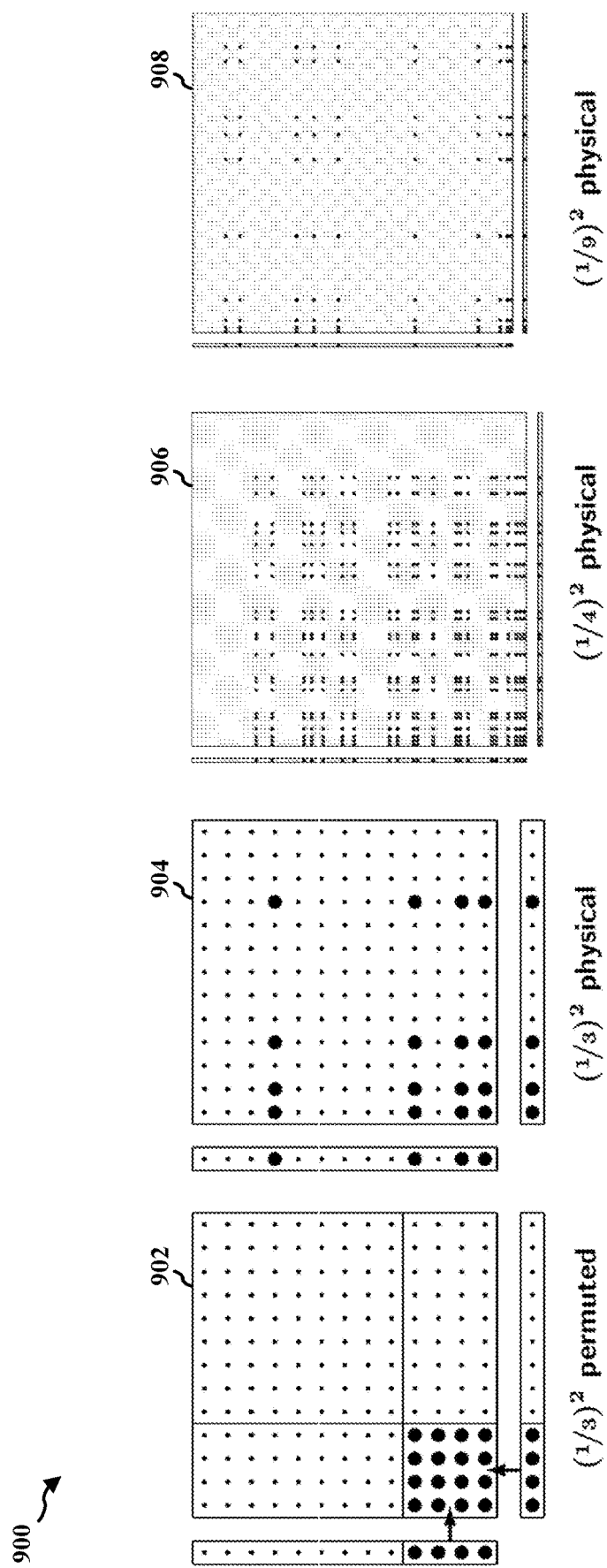
FIG. 9 is a diagram illustrating examples of Singer product apertures.

Given any two 1-D Singer apertures with open fractions in the range $0 < \rho, \sigma \leq \frac{1}{2}$, their Cartesian product is called a Singer product aperture, and has overall open faction $\rho \times \sigma$. FIG. 9 is a diagram 900 illustrating examples of Singer product apertures. The example 902 shows a Singer product aperture with open fraction $\rho \times \sigma = \frac{1}{3} \times \frac{1}{3} = \frac{1}{9}$, with the rows and columns permuted to show the structure. The example 904 shows the Singer product aperture of the example 902 as it physically exists. The examples 906 and 908 show $(\frac{1}{4})^2$ and $(\frac{1}{9})^2$ Singer product apertures, respectively. In visual appearance, the Singer product apertures resemble PNP apertures, in that the distribution of the holes is not entirely random, but also conventionally wrapped apertures, in that the density of the holes can be made as small as one may like.

Even though the number of pixels on the two 1-D Singer Apertures forming a Singer product aperture is the same in the examples shown in FIG. 9, one of ordinary skill in the art would realize that the number of pixels on the two 1-D Singer Apertures forming a Singer product aperture may be different. Even though the Cartesian product involves the two 1-D apertures arranged perpendicular to each other in the examples shown in FIG. 9, one of ordinary skill in the art would recognize that non-perpendicular system, such as a parallelogram-shaped aperture and pixels or a parallelogram based on a hexagonal structure is applicable. Some embodiments of coded apertures may be "Cartesian products" in the algebraic meaning of the term, but geometrically may resemble parallelograms, hexagons, or even other weird shapes. All of such embodiments of coded apertures do have a pair of axes, the only difference is that the axes need not be exactly at 90 degrees to each other but can be 60 degrees, 45 degrees or in fact any angle other than zero.

Figure 10:
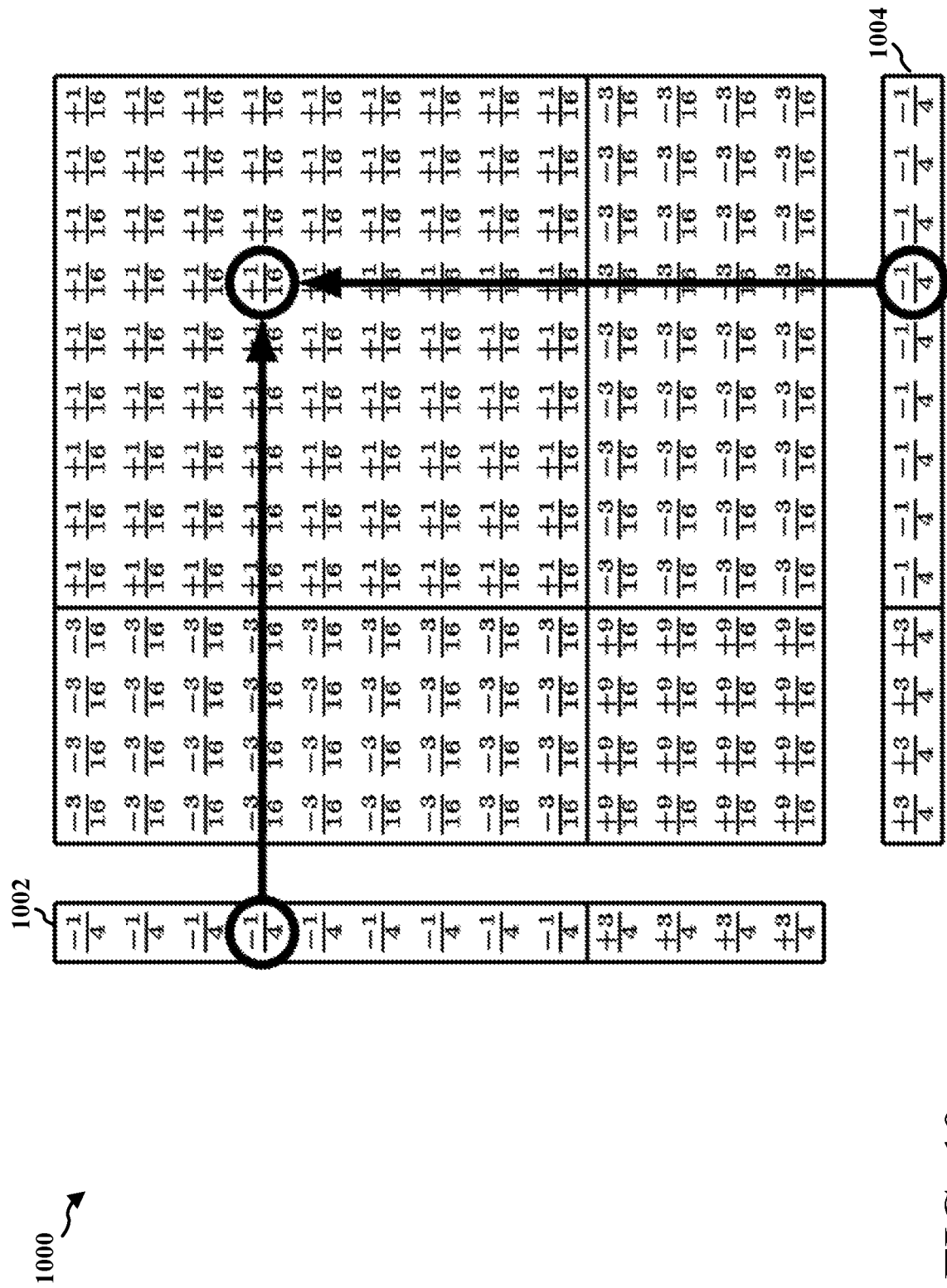
FIG. 10 is a diagram illustrating an example of a Cartesian product of two balanced 1-dimensional decoders.

In some embodiments, the Cartesian product of any pair of 1-D apertures with balanced decoders, e.g. Singer sets, may be decoded by the product of their balanced decoders. FIG. 10 is a diagram illustrating an example of a Cartesian product 1000 of two balanced 1-dimensional decoders 1002 and 1004. The open fraction of the 1-D aperture corresponding to the balanced 1-D decoder 1004 is $\rho = \frac{1}{4}$, and the open fraction of the 1-D aperture corresponding to the balanced 1-D decoder 1002 is $\sigma = \frac{1}{2}$. In the example, each 2-D entry of the Cartesian product 1000 is the product of the corresponding 1-D entries on the two balanced 1-D decoders 1002 and 1004, e.g., $(-\frac{1}{4}) \times (-\frac{1}{4}) = +\frac{1}{16}$. The proof would not have been obvious to the experts because it applies to any 1-D apertures with balanced decoders not just unimodular decoders, i.e. complicated fractions not just ±1's, so the results already known for PNP's and (M)URA's and which depended on unimodularity would not have seemed to be applicable.

The best SNR may be achieved by adjusting $\sigma$ and $\rho$ to match the optimal open fractions $\rho_{opt} = \sigma_{opt} = 1/(1+m^{1/3})$, where m is the number of object pixels. In some embodiments, the Cartesian product of 1-D apertures described above in FIG. 9 may be fast decoded. Similar to the fast decoding described above with reference to FIG. 8, the fast decoding corresponding to a Cartesian product of 1-D apertures may be accomplished using the 1-D balanced decoders of the 1-D apertures to decode first the columns and then the rows. Alternatively, the fast decoding corresponding to the Cartesian product of 1-D apertures may be accomplished using the 1-D balanced decoders of the 1-D apertures to decode first the rows and then the columns. In some embodiments, the Cartesian product of 1-D apertures described above in FIG. 9 may be decoded even faster than being decoded with fast decoding, as will be described below in FIG. 11.

Figure 11:
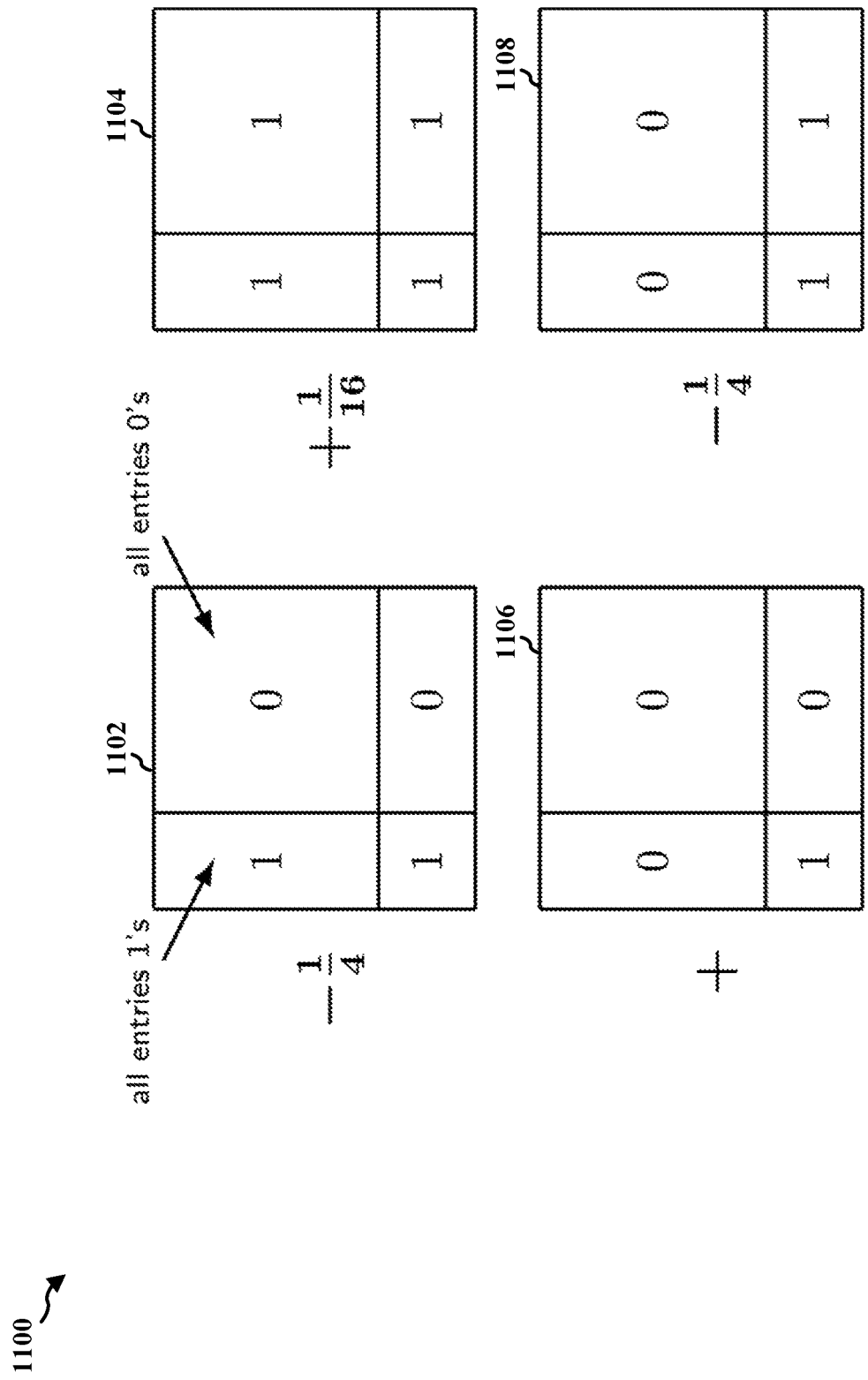
FIG. 11 is a diagram illustrating an example of decomposing the Cartesian product of balanced 1-dimensional decoders described above in FIG. 10 as a weighted sum of four direct decoders, each of which involving only ones and zeros.

FIG. 11 is a diagram 1100 illustrating an example of decomposing the Cartesian product 1000 of balanced 1-dimensional decoders described above in FIG. 10 as a weighted sum of four direct decoders 1102, 1104, 1106,

1108, each of which involving only ones and zeros. As illustrated, the weight of the direct decoder 1102 is $-1 \times \sigma = -\frac{1}{4}$, the weight of the direct decoder 1108 is $-1 \times \rho = -\frac{1}{4}$, the weight of the direct decoder 1104 is $\rho \times \sigma = \frac{1}{16}$, and the weight of the direct decoder 1106 is $+1$. The method to use the weighted sum of four direct decoders 1102, 1104, 1106, 1108 to decode the Cartesian product of 1-D apertures may be referred to as direct vector decoding. The direct decoder 1106 is the Cartesian product of the 1-D direct decoders (e.g., the 1-D apertures forming the 2-D aperture), and can therefore be factorised as a fast column and row decoding, as illustrated below in FIG. 12.

Figure 12:
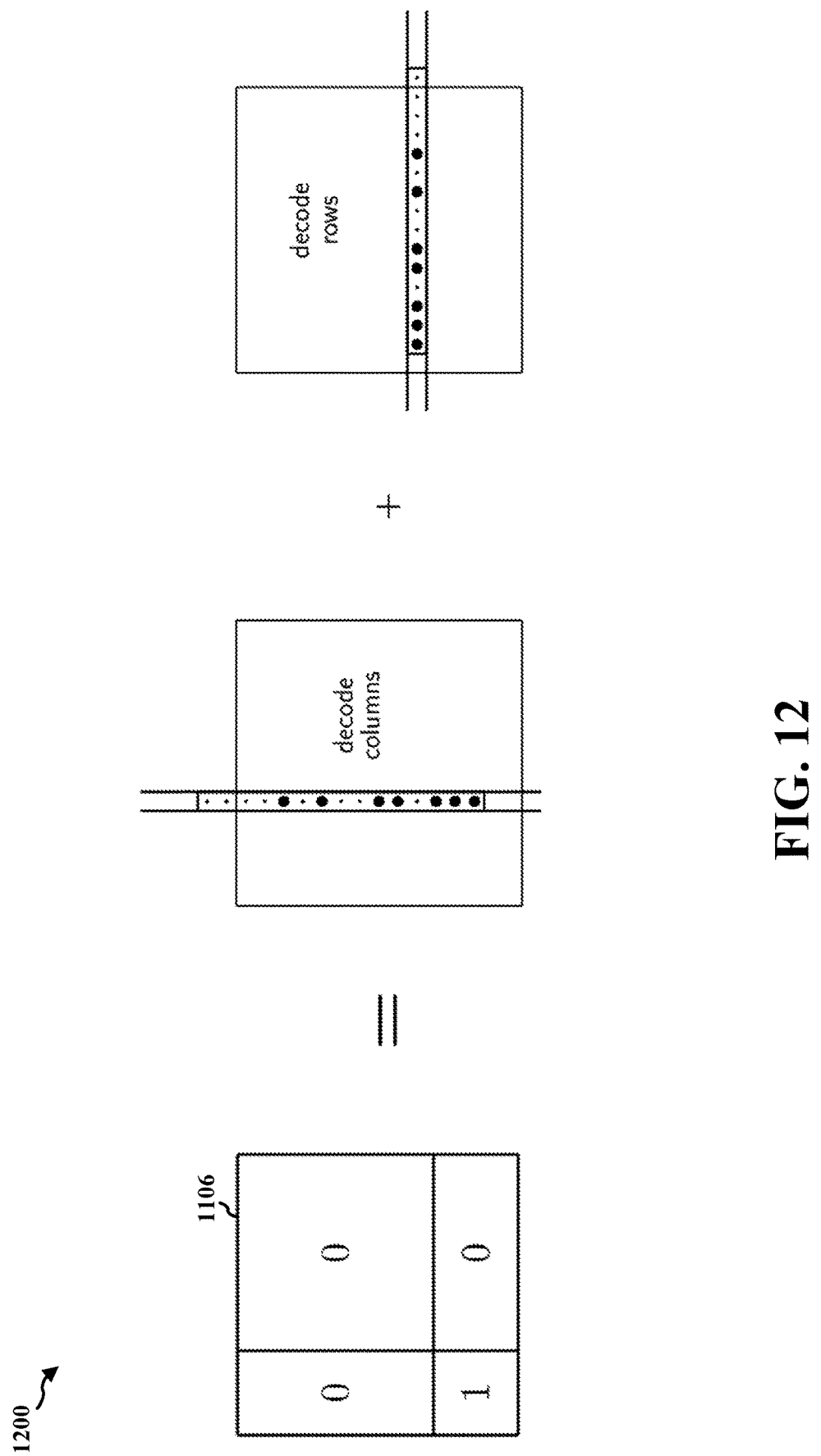
FIG. 12 is a diagram illustrating an example of fast decoding with the decomposed direct decoder described above in FIG. 11.

FIG. 12 is a diagram 1200 illustrating an example of fast decoding with the decomposed direct decoder 1106 described above in FIG. 11. The direct decoder 1106 is the product aperture. Fast decoding with the decomposed direct decoder 1106 only sums over the holes so is significantly faster than the fast decoding described above in FIG. 8. The other three direct decoders 1108, 1102, 1104 turn out to be just row and column sums of the direct decoder 1106, taking negligible additional time. Again, this was not obvious to the experts because conventional product aperture decoders are symmetrical and unimodular, so decomposing this way, would not immediately appear to be helpful. Singer product decoders, however, are asymmetrical. For example, in the Cartesian product 1000 described above in FIG. 10, the quadrant with $+\frac{1}{16}$'s is larger than the others. So an additional step is to subtract $\frac{1}{16}$ from everything, and from this the decomposition follows.

Figure 13:
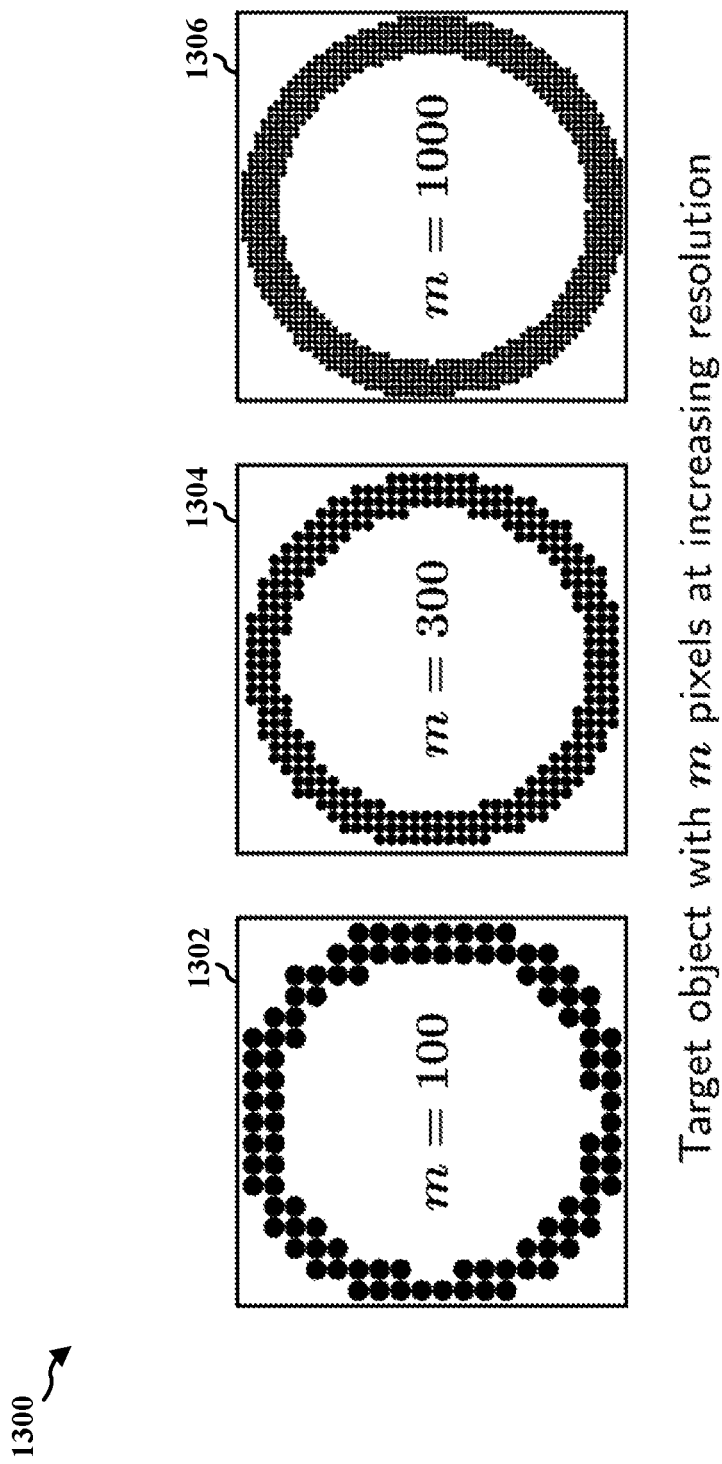
FIG. 13 is a diagram illustrating an example of target object that may be used to compare the performance of different types of apertures.

Singer product apertures combine the advantages of both existing types of conventional apertures: like product apertures, they have a fast decoding algorithm, and like wrapped apertures their open fraction can be adjusted to achieve high SNR. FIG. 13 is a diagram 1300 illustrating an example of target object that may be used to compare the performance of different types of apertures. The target object is designed to resemble a cross-section through a heart, and occupying about one quarter of the field of view. It is desirable to image the target object at the highest possible resolution, and as the resolution increases the number m of pixels into which the object divides increases. As illustrated in the example, the target object is with 100 pixels in diagram 1302, 300 pixels in diagram 1304, 1000 pixels in diagram 1306.

Figure 14:
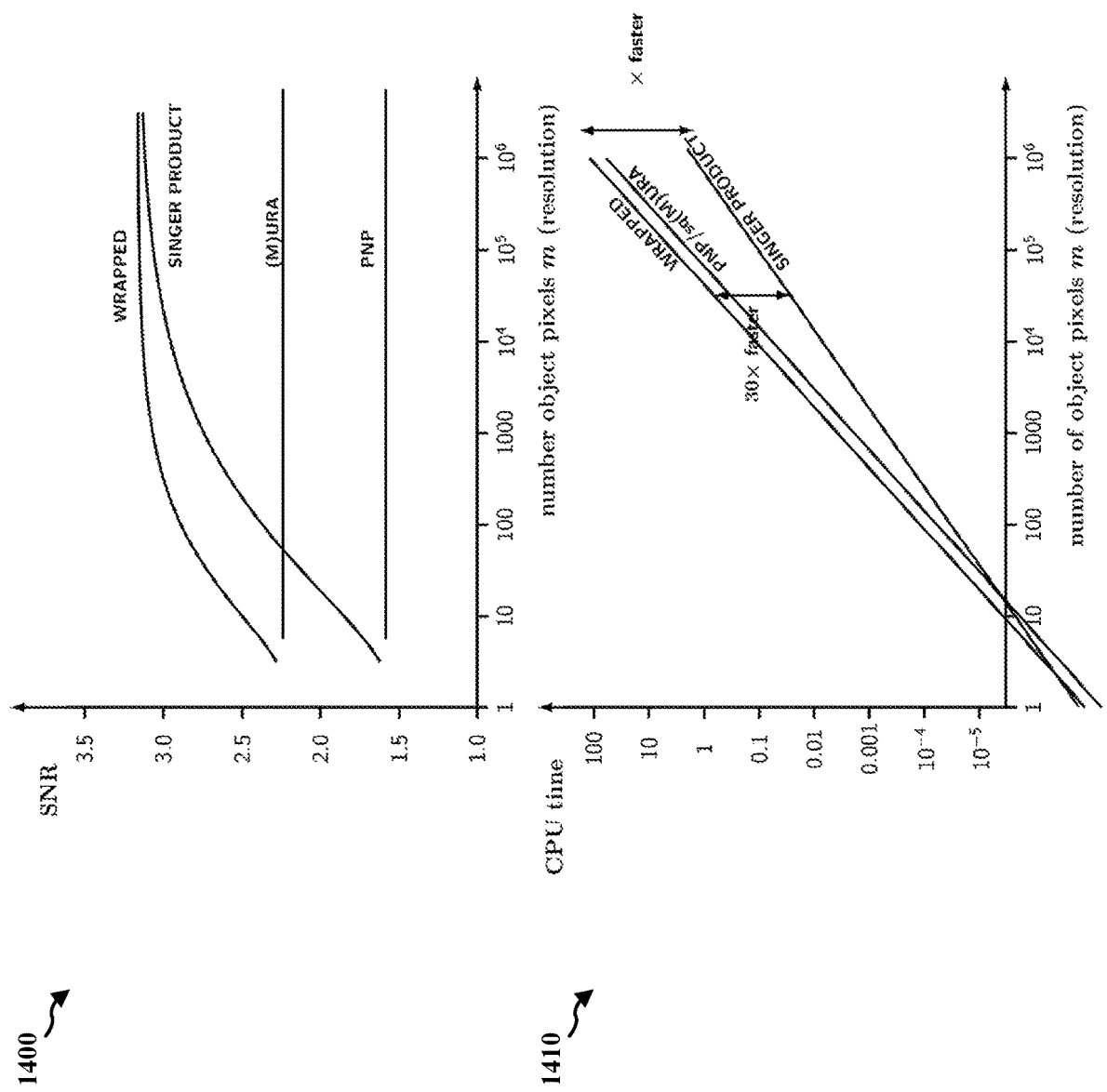
FIG. 14 illustrates the SNR and computing time required for these different apertures for increasing resolution.

FIG. 14 illustrates the SNR and computing time required for these different apertures for increasing resolution (i.e. m increasing). For SNR, the pixel brightness is proportional to m (more precisely, 10×m photons are assumed to strike the aperture from each object pixel) to avoid the vertical scale being too exaggerated. For CPU times, a 3 GHz processor is assumed.

The SNR graph 1400 shows that PNP and sq(M)URA apertures are adequate at low resolution (m<10) but lag behind the other apertures at high resolution because their open fractions are fixed, unlike Singer product or conventionally wrapped apertures whose open fractions can be adjusted to match $\rho_{opt}$ for any given m. Surprisingly, the gap between the Singer product and conventionally wrapped apertures tends to zero as the resolution m increases. This means that at high resolution there is effectively no SNR penalty incurred in preferring the faster Singer product apertures.

The CPU time graph 1410 shows that PNP and sq(M) URA apertures (which have the same speed because they share the same decoder) are faster than conventionally wrapped apertures only by a fixed factor (lines are parallel). This is because a fast decoding algorithm operating over many holes is not much faster than a slow decoding algorithm operating over few holes. Singer product apertures follow a different power law (line with a shallower slope) hence are faster than all of these conventional apertures by a factor which itself increases as the resolution increases. Therefore, for image sizes that are greater than 1M pixels, Singer product apertures suffer asymptotically negligible loss of SNR and decode faster than other apertures by a factor of at least 100×, and which increases as image size increases.

Even faster decoding speeds may be achieved using 1-D apertures which are themselves products of Singer 1-D apertures but which have been unwrapped to make them 1-dimensional again. When fast decoding Cartesian products of such 1-D apertures, the rows and columns may themselves be fast decoded, making images of size >10M pixels feasible on modern computers, for which the loss in SNR may be asymptotically negligible.

By combining the speed of conventional product apertures with the high SNR of conventionally wrapped apertures, Singer product apertures make coded aperture video (CAV) a practical possibility for the first time. Coded apertures, just like the lenses of a conventional camera system, can essentially be freely interchanged. This means that Singer product apertures may be used immediately in any application which currently uses a coded aperture, with almost no other hardware changes, only the software for the fast decoding algorithm needs to be added. To reap the benefits, a detector fast enough to keep pace with the fast decoding algorithm may be needed.

In hazardous radiation detection, coded aperture video from a Singer product aperture superimposed on a visible band field of view may significantly improve the quality of the 3-D visualisation, helping remote operators to locate quickly and to deal efficiently with highly radioactive fragments.

In anti-personnel landmine detection, Singer product apertures may allow coded aperture video to be overlaid on the visible band field of view for better 3-D visualisation than still images. The buried landmines may appear to the operator as bright patches hovering just below the surface of the ground, rendering them easier and safer to remove.

In medical imaging, determining heart position, shape and size is one of the most important reasons for taking chest X-rays. But even with short exposure times (typically <0.1 sec), the point in the heart contraction cycle at which the exposure was taken is unknown, affecting the certainty of the diagnosis. Singer product apertures may be used with both X-rays and radioisotope imaging to capture video instead, showing internal movement e.g. the beating of the heart, or circulation within the bloodstream, improving the quality of diagnoses in cases of coronary and other circulatory diseases.

Coded apertures may be offered as an alternative to conventional imaging in both the visible and infra-red bands, and enjoy significant advantages such as compactness, light weight and low cost, also lack of optical aberrations, and much greater strength. For example, in a combat-vehicle mounted infrared imaging system, the coded aperture "lens" could be made of titanium rather than glass, giving greatly improved battlefield survivability.

The large fraction of the field of view occupied by the objects being imaged means that open fractions in the range $\rho = \frac{1}{25}$ to $\frac{1}{125}$ are in fact required for optimal SNR. Singer product apertures may provide exactly this range of open fractions, and tests show that the direct vector decoding algorithm would have achieved a frame rate of 100 fps.

Furthermore, this increase in decoding speed would also now make feasible the solution for overcoming the problem of diffraction effects. This solution is to combine the output from different aperture configurations interleaved in real-time, using reconfigurable apertures based on microshuttered pixels. In other words, the aperture itself would cycle between several different hole patterns on the timescale of a few milliseconds, and by combining the separate decoded images the diffraction limitations of the coded aperture are effectively overcome. Thus, with Singer product apertures and fast decoding, coded aperture video in both the visible and infrared bands may be competitive with conventional imaging, i.e. coded apertures are no longer confined to the high energy domain.

Figure 15:
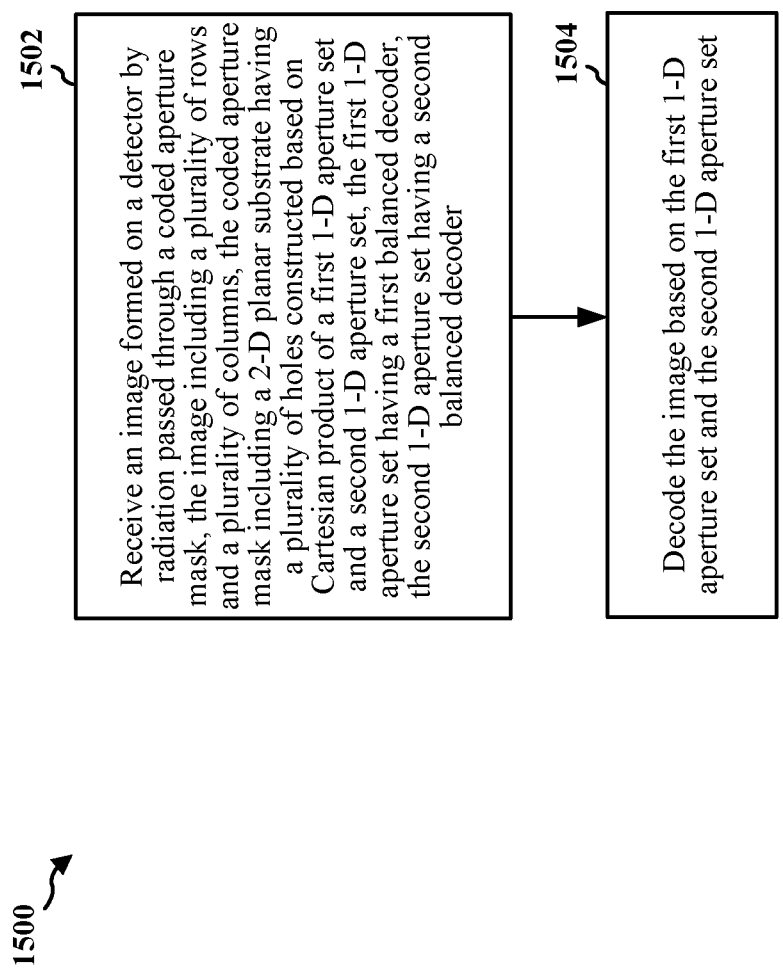
FIG. 15 is a flowchart of a method of coded aperture imaging.

FIG. 15 is a flowchart 1500 of a method of coded aperture imaging. In some embodiments, the method may be used to decode a product aperture described above in FIG. 9. In one embodiment, the method may be performed by an apparatus (e.g., the apparatus 1902/1902').

At 1502, the apparatus may receive an image formed on a detector by radiation passed through a coded aperture mask. The image may include a plurality of rows and a plurality of columns. The coded aperture mask may include a 2-D planar substrate having a plurality of holes constructed based on the Cartesian product of a first 1-D aperture set and a second 1-dimensional aperture set. The first 1-D aperture set may have a first balanced decoder. The second 1-D aperture set may have a second balanced decoder.

In some embodiments, the Cartesian product may involve the first 1-D aperture set and the second 1-D aperture set arranged in a non-zero angle to each other. The first 1-D aperture set may define a first axis of the 2-D planar substrate. The second 1-D aperture set may define a second axis of the 2-D planar substrate. The plurality of holes on the 2-D planar substrate may correspond to holes in both of the first 1-D aperture set and the second 1-D aperture set. In some embodiments, the non-zero angle may be 90 degrees.

In some embodiments, the first 1-D aperture set may have a first open fraction, which may be a first ratio of the number of holes in the first 1-D aperture set to the total number of pixels in the first 1-D aperture set. The second 1-D aperture set may have a second open fraction, which may be a second ratio of the number of holes in the second 1-D aperture set to the total number of pixels in the second 1-D aperture set. In some embodiments, each of the first open fraction and the second open fraction may be adjustable in a range between 0 and 0.5.

In some embodiments, each of the first 1-D aperture set and the second 1-D aperture set is one of a Singer set, a quadratic residue set, a biquadratic residue set, or an octic residue set. In some embodiments, each of the first 1-D aperture set and the second 1-D aperture set may be chosen from a family of sets that possess balanced decoders or products of the family of sets unwrapped to make the products 1-dimensional.

At 1504, the apparatus may decode the image based on the first 1-D aperture set and the second 1-D aperture set. In some embodiments, the operations performed at 1504 may include operations described below with reference to FIG. 16 or 17.

Figure 16:
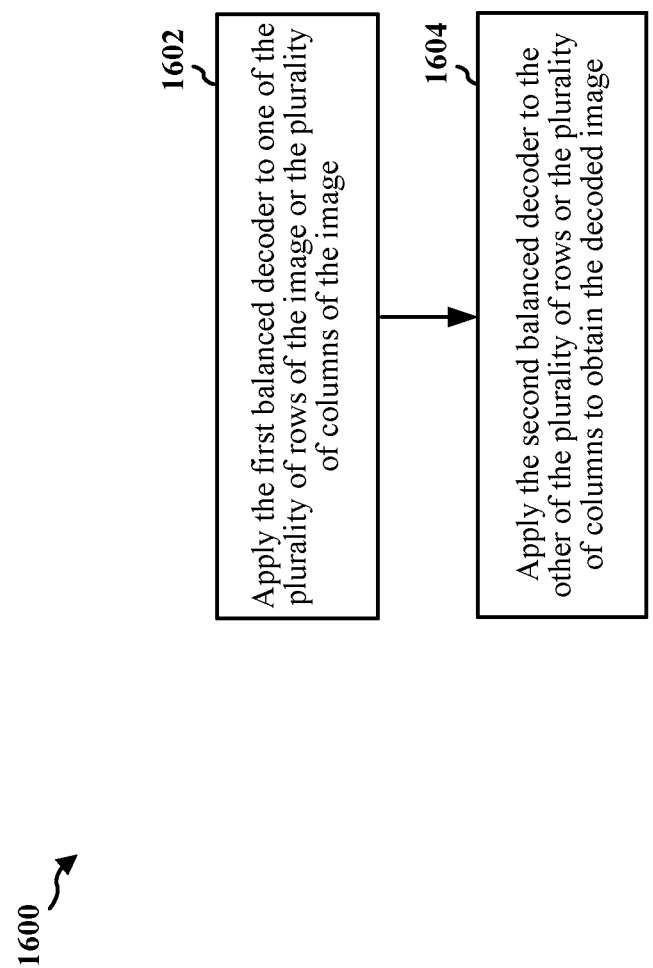
FIG. 16 is a flowchart of a method of decoding a product aperture described above in FIG. 9.

FIG. 16 is a flowchart 1600 of a method of decoding a product aperture described above in FIG. 9. In one embodiment, the method may be performed by an apparatus (e.g., the apparatus 1902/1902'). In one embodiment, the operations performed in the method may be part of the operations described above at 1504 in FIG. 15. In some embodiments, the method may be the fast decoding described above with reference to FIGS. 8 and 10.

At 1602, the apparatus may apply the first balanced decoder to one of the plurality of rows of the image or the plurality of columns of the image.

At 1604, the apparatus may apply the second balanced decoder to the other of the plurality of rows or the plurality of columns to obtain the decoded image.

Figure 17:
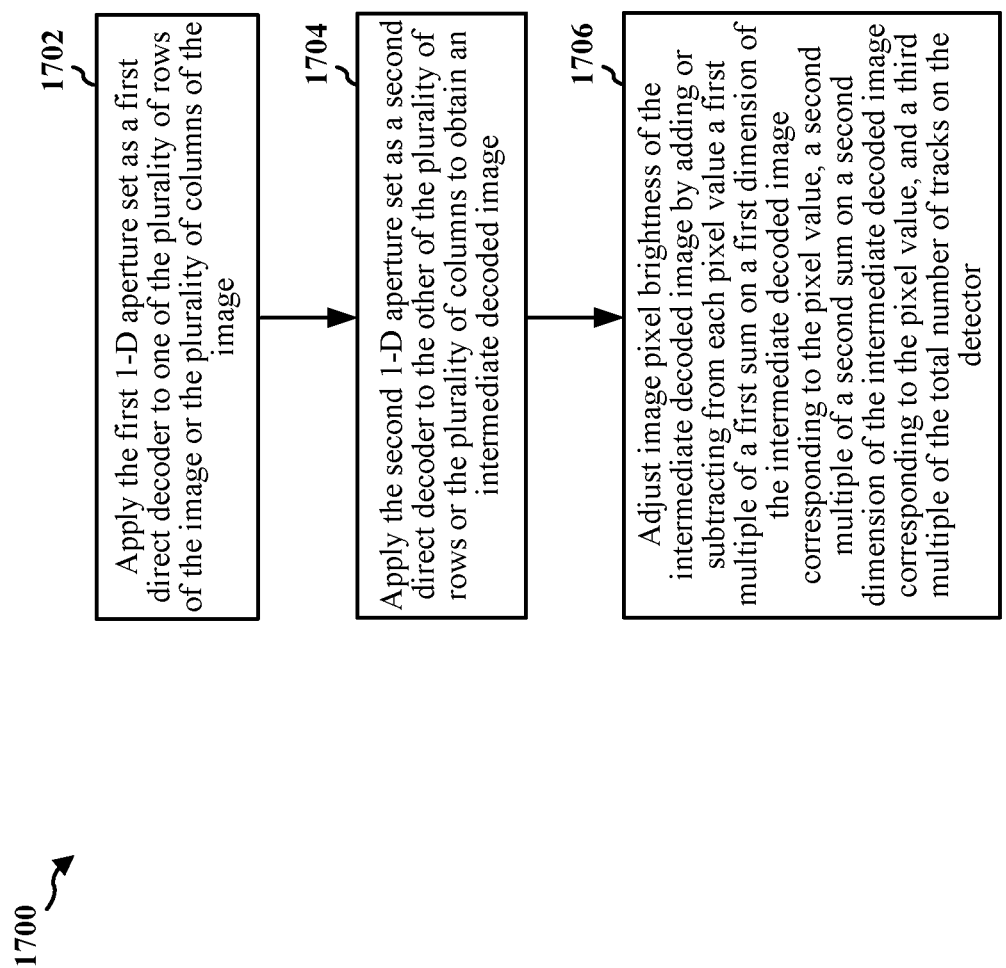
FIG. 17 is a flowchart of another method of decoding a product aperture described above in FIG. 9.

FIG. 17 is a flowchart 1700 of another method of decoding a product aperture described above in FIG. 9. In one embodiment, the method may be performed by an apparatus (e.g., the apparatus 1902/1902'). In one embodiment, the operations performed in the method may be part of the operations described above at 1504 in FIG. 15. In some embodiments, the method may be the direct vector decoding described above with reference to FIGS. 10-12.

At 1702, the apparatus may apply the first 1-D aperture set as a first direct decoder to one of the plurality of rows of the image or the plurality of columns of the image.

At 1704, the apparatus may apply the second 1-D aperture set as a second direct decoder to the other of the plurality of rows or the plurality of columns to obtain an intermediate decoded image.

At 1706, the apparatus may adjust image pixel brightness of the intermediate decoded image by adding or subtracting from each pixel value a first multiple of a first sum on a first dimension (row or column sum) of the intermediate decoded image corresponding to the pixel value, a second multiple of a second sum on a second dimension (row or column sum) of the intermediate decoded image corresponding to the pixel value, and a third multiple of the total number of tracks on the detector.

Figure 18:
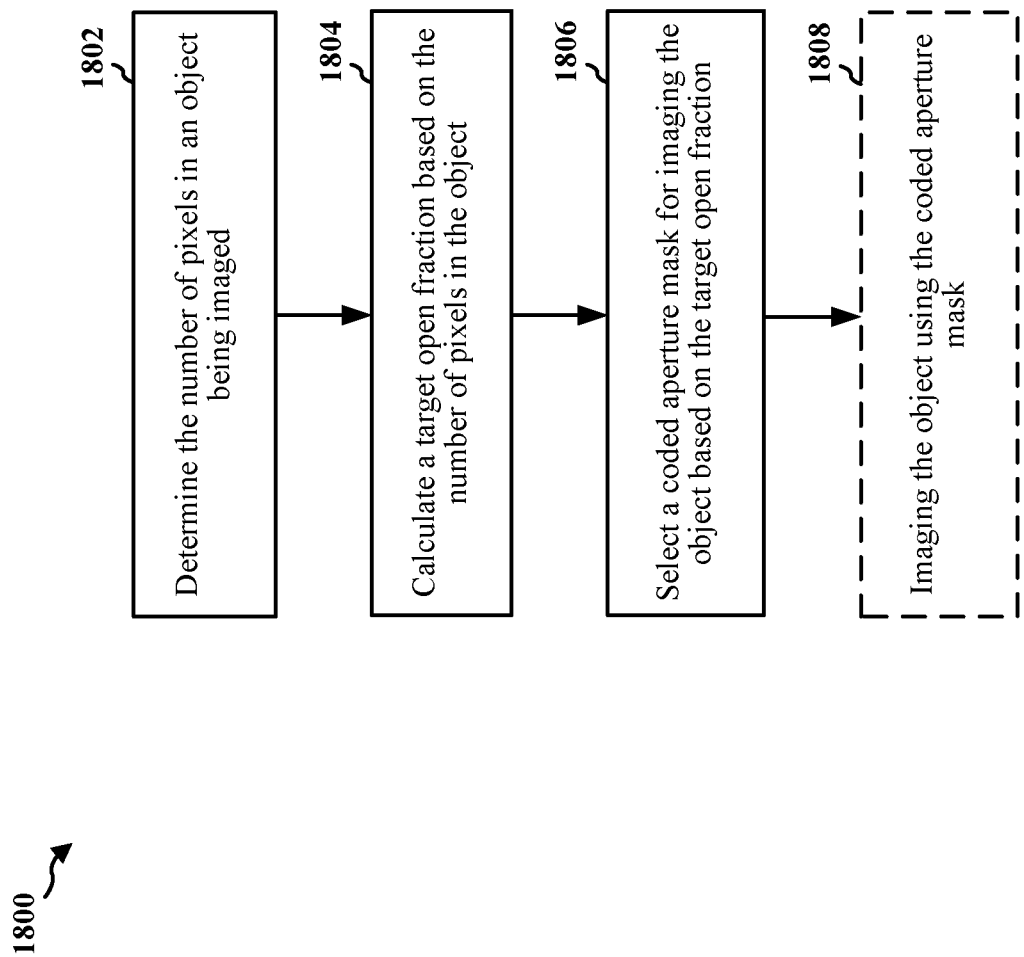
FIG. 18 is a flowchart of a method of coded aperture imaging.

FIG. 18 is a flowchart 1800 of a method of coded aperture imaging. In some embodiments, the method may be used to determine the number of holes in a product aperture described above in FIG. 9. In one embodiment, the method may be performed by an apparatus (e.g., the apparatus 1902/1902').

At 1802, the apparatus may determine the number of pixels in an object being imaged.

At 1804, the apparatus may calculate a target open fraction based on the number of pixels in the object. In some embodiments, the target open fraction may be $1/(1+m^{1/3})$, where m is the number of pixels in the object.

At 1806, the apparatus may select a coded aperture mask for imaging the object based on the target open fraction. In some embodiments, the coded aperture mask may include a 2-D planar substrate having a plurality of holes constructed based on the Cartesian product of a first 1-D aperture set and a second 1-dimensional aperture set. The first 1-D aperture set may have a first balanced decoder. The second 1-D aperture set may have a second balanced decoder. In some embodiments, the Cartesian product may involve the first 1-D aperture set and the second 1-D aperture set arranged in a non-zero angle to each other. The first 1-D aperture set may define a first axis of the 2-D planar substrate. The second 1-D aperture set may define a second axis of the 2-D planar substrate. The plurality of holes on the 2-D planar substrate may correspond to holes in both of the first 1-D aperture set and the second 1-D aperture set. In some embodiments, the non-zero angle may be 90 degrees.

In some embodiments, the first 1-D aperture set may have a first open fraction, which may be a first ratio of the number of holes in the first 1-D aperture set to the total number of pixels in the first 1-D aperture set. The second 1-D aperture set may have a second open fraction, which may be a second ratio of the number of holes in the second 1-D aperture set to the total number of pixels in the second 1-D aperture set.

In some embodiments, to selecting the coded aperture mask, the apparatus may select the first 1-D aperture set so that the first open fraction is closest to the target open fraction, and select the second 1-D aperture set so that the second open fraction is closest to the target open fraction.

In some embodiments, each of the first 1-D aperture set and the second 1-D aperture set is one of a Singer set, a quadratic residue set, a biquadratic residue set, or an octic residue set. In some embodiments, each of the first 1-D aperture set and the second 1-D aperture set may be chosen from a family of sets that possess balanced decoders or products of the family of sets unwrapped to make the products 1-dimensional.

At 1808, the apparatus may optionally image the object using the selected coded aperture mask.

Figure 19:
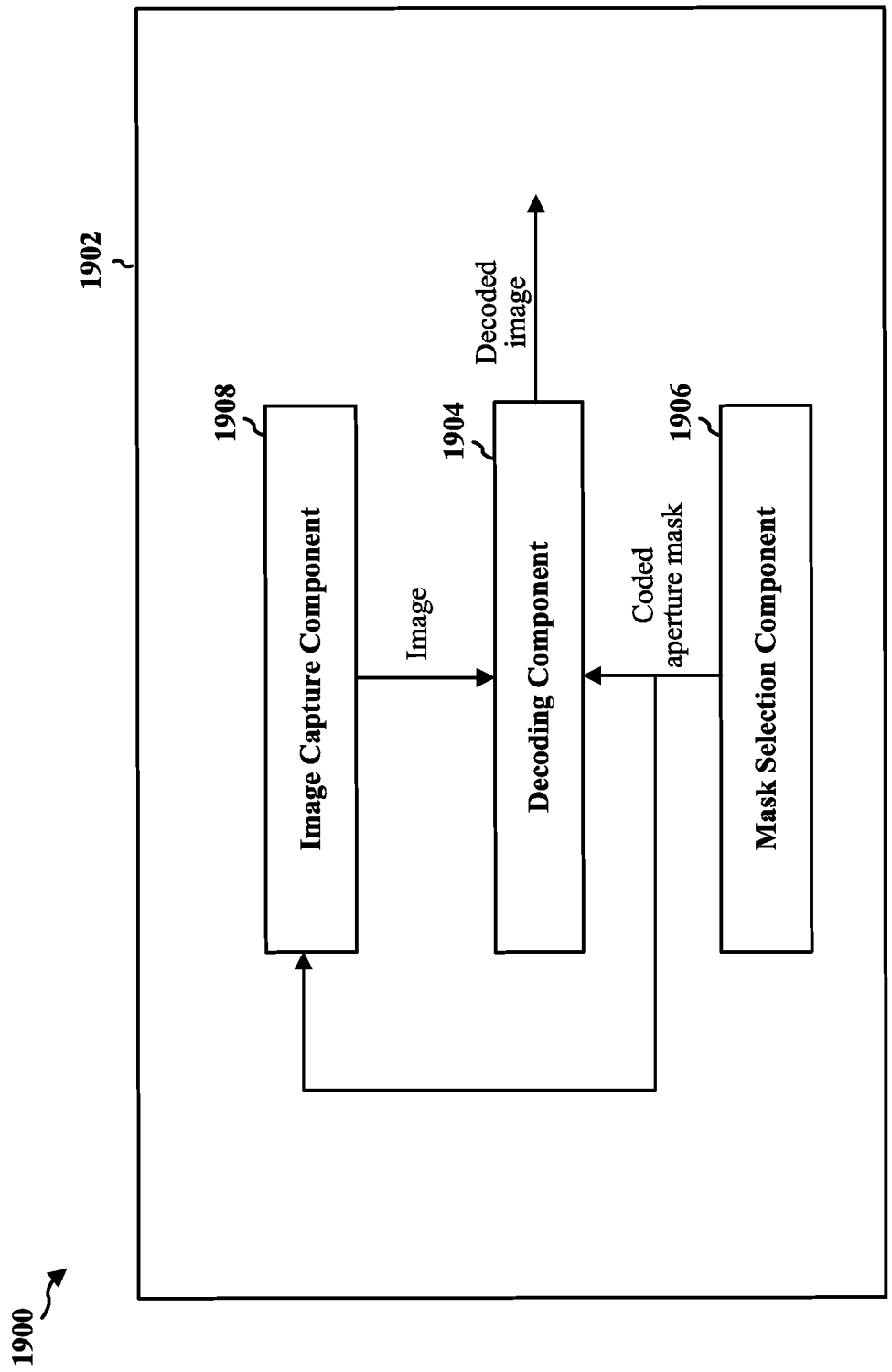
FIG. 19 is a conceptual data flow diagram illustrating the data flow between different means/components in an exemplary apparatus.

FIG. 19 is a conceptual data flow diagram 1900 illustrating the data flow between different means/components in an exemplary apparatus 1902. In one embodiment, the apparatus 1902 may include one or more computing devices.

The apparatus 1902 may include an image capture component 1908 that captures an image of an object using a Singer product aperture and a detector. In one embodiment, the image capture component 1908 may perform the operations described above with reference to 1502 in FIG. 15, or 1808 in FIG. 18.

The apparatus 1902 may include a mask selection component 1906 that selects an optimal coded aperture mask based on the number of pixels in the object to be imaged. The selected coded aperture mask may be used by the image capture component 1908 to perform coded aperture imaging. In one embodiment, the mask selection component 1906 may perform the operations described above with reference to 1802, 1804, or 1806 in FIG. 18.

The apparatus 1902 may include a decoding component 1904 that decodes the image received from the image capture component 1908 based on the coded aperture mask selected by the mask selection component 1906, and outputs a decoded image. In one embodiment, the decoding component 1904 may perform the operations described above with reference to 1504 in FIG. 15, or 1602, 1604 in FIG. 16, or 1702-1706 in FIG. 17.

The apparatus 1902 may include additional components that perform each of the blocks of the algorithm in the aforementioned flowcharts of FIGS. 15-18. As such, each block in the aforementioned flowcharts of FIGS. 15-18 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 20:
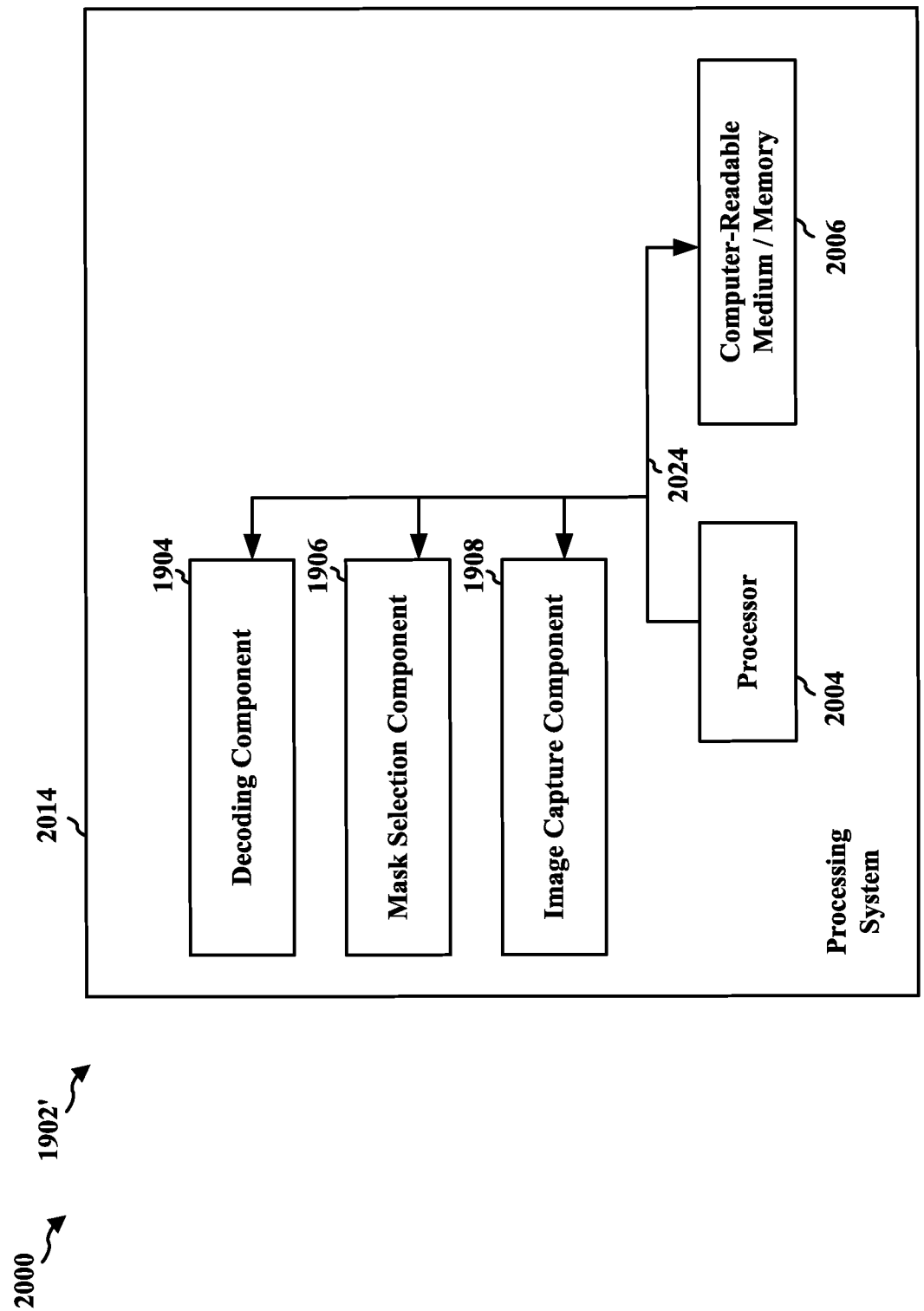
FIG. 20 is a diagram illustrating an example of a hardware implementation for an apparatus employing a processing system.

FIG. 20 is a diagram 2000 illustrating an example of a hardware implementation for an apparatus 1902' employing a processing system 2014. In one embodiment, the apparatus 1902' may be the apparatus 1902 described above with reference to FIG. 19. The processing system 2014 may be implemented with a bus architecture, represented generally by the bus 2024. The bus 2024 may include any number of interconnecting buses and bridges depending on the specific application of the processing system 2014 and the overall design constraints. The bus 2024 links together various circuits including one or more processors and/or hardware components, represented by the processor 2004, the components 1904, 1906, 1908, and the computer-readable medium/memory 2006. The bus 2024 may also link various other circuits such as timing sources, peripherals, voltage regulators, and power management circuits, which are well known in the art, and therefore, will not be described any further.

The processing system 2014 includes a processor 2004 coupled to a computer-readable medium/memory 2006. The processor 2004 is responsible for general processing, including the execution of software stored on the computer-readable medium/memory 2006. The software, when executed by the processor 2004, causes the processing system 2014 to perform the various functions described supra for any particular apparatus. The computer-readable medium/memory 2006 may also be used for storing data that is manipulated by the processor 2004 when executing software. The processing system 2014 further includes at least one of the components 1904, 1906, 1908. The components may be software components running in the processor 2004, resident/stored in the computer readable medium/memory 2006, one or more hardware components coupled to the processor 2004, or some combination thereof.

In the following, various aspects of this disclosure will be illustrated:

Example 1 is a coded aperture mask. The coded aperture mask may include a 2-D planar substrate having a plurality of holes constructed based on a Cartesian product of a first 1-D aperture set and a second 1-D aperture set. The first 1-D aperture set may have a first balanced decoder. The second 1-D aperture set may have a second balanced decoder. The Cartesian product may involve the first 1-D aperture set and the second 1-D aperture set arranged in a non-zero angle to each other. The first 1-D aperture set may define a first axis of the 2-D planar substrate. The second 1-D aperture set may define a second axis of the 2-D planar substrate. The plurality of holes may correspond to holes in both of the first 1-D aperture set and the second 1-D aperture set.

In Example 2, the subject matter of Example 1 may optionally include that a first cyclic correlation between the first balanced decoder and the first 1-D aperture set has identically zero sidelobes, and a second cyclic correlation between the second balanced decoder and the second 1-D aperture set has identically zero sidelobes.

In Example 3, the subject matter of any one of Examples 1 to 2 may optionally include that the first 1-D aperture set may have a first open fraction, which may be a first ratio of the number of holes in the first 1-D aperture set to the total number of pixels in the first 1-D aperture set, and the second 1-D aperture set may have a second open fraction, which may be a second ratio of the number of holes in the second 1-D aperture set to the total number of pixels in the second 1-D aperture set.

In Example 4, the subject matter of Example 3 may optionally include that each of the first open fraction and the second open fraction may be adjustable in a range between 0 and 0.5.

In Example 5, the subject matter of any one of Examples 1 to 4 may optionally include that each of the first 1-D aperture set and the second 1-D aperture set may be one of a Singer set, a quadratic residue set, a biquadratic residue set, or an octic residue set.

In Example 6, the subject matter of any one of Examples 1 to 4 may optionally include that each of the first 1-D aperture set and the second 1-D aperture set may be chosen from a family of sets that possess balanced decoders or products of the family of sets unwrapped to make the products 1-dimensional.

In Example 7, the subject matter of any one of Examples 1 to 6 may optionally include that the non-zero angle may be 90 degrees.

Example 8 is a method or apparatus for coded aperture imaging. The method or apparatus may receive an image formed on a detector by radiation passed through a coded aperture mask. The image may include a plurality of rows and a plurality of columns. The coded aperture mask may include a 2-D planar substrate having a plurality of holes constructed based on a Cartesian product of a first 1-D aperture set and a second 1-D aperture set. The first 1-D aperture set may have a first balanced decoder, and the second 1-D aperture set may have a second balanced decoder. The method or apparatus may decode the image based on the first 1-D aperture set and the second 1-D aperture set.

In Example 9, the subject matter of Example 8 may optionally include that the Cartesian product may involve the first 1-D aperture set and the second 1-D aperture set arranged in a non-zero angle to each other, the first 1-D aperture set defining a first axis of the 2-D planar substrate, and the second 1-D aperture set defining a second axis of the 2-D planar substrate, and the plurality of holes may correspond to holes in both of the first 1-D aperture set and the second 1-D aperture set.

In Example 10, the subject matter of Example 9 may optionally include that the non-zero angle may be 90 degrees.

In Example 11, the subject matter of any one of Examples 8 to 10 may optionally include that the first 1-D aperture set may have a first open fraction, which may be a first ratio of the number of holes in the first 1-D aperture set to the total number of pixels in the first 1-D aperture set, and the second 1-D aperture set may have a second open fraction, which may be a second ratio of the number of holes in the second 1-D aperture set to the total number of pixels in the second 1-D aperture set.

In Example 12, the subject matter of Example 11 may optionally include that each of the first open fraction and the second open fraction may be adjustable in a range between 0 and 0.5.

In Example 13, the subject matter of any one of Examples 8 to 12 may optionally include that each of the first 1-D aperture set and the second 1-D aperture set may be one of a Singer set, a quadratic residue set, a biquadratic residue set, or an octic residue set.

In Example 14, the subject matter of any one of Examples 8 to 12 may optionally include that each of the first 1-D aperture set and the second 1-D aperture set may be chosen from a family of sets that possess balanced decoders or products of the family of sets unwrapped to make the products 1-dimensional.

In Example 15, the subject matter of any one of Examples 8 to 14 may optionally include that, to decode the image, the method or apparatus may: apply the first balanced decoder to one of the plurality of rows or the plurality of columns of the image; and apply the second balanced decoder to the other of the plurality of rows or the plurality of columns of the image.

In Example 16, the subject matter of any one of Examples 8 to 14 may optionally include that, to decode the image, the method or apparatus may: apply the first 1-D aperture set as a first direct decoder to one of the plurality of rows or the plurality of columns of the image; apply the second 1-D aperture set as a second direct decoder to the other of the plurality of rows or the plurality of columns of the image to obtain an intermediate decoded image; and adjust image pixel brightness of the intermediate decoded image by adding or subtracting from each pixel value a first multiple of a first sum on a first dimension of the intermediate decoded image corresponding to the pixel value, a second multiple of a second sum on a second dimension of the intermediate decoded image corresponding to the pixel value, and a third multiple of the total number of tracks on the detector.

Example 17 is a method or apparatus for coded aperture imaging. The method or apparatus may determine the number of pixels in an object being imaged, calculate a target open fraction based on the number of pixels, and select a coded aperture mask for imaging the object based on the target open fraction.

In Example 18, the subject matter of Example 17 may optionally include that the coded aperture mask may include a 2-D planar substrate having a plurality of holes constructed based on a Cartesian product of a first 1-D aperture set and a second 1-D aperture set, the first 1-D aperture set having a first balanced decoder, and the second 1-D aperture set having a second balanced decoder.

In Example 19, the subject matter of Example 18 may optionally include that the Cartesian product may involve the first 1-D aperture set and the second 1-D aperture set arranged in a non-zero angle to each other, the first 1-D aperture set defining a first axis of the 2-D planar substrate, and the second 1-D aperture set defining a second axis of the 2-D planar substrate, and the plurality of holes may correspond to holes in both of the first 1-D aperture set and the second 1-D aperture set.

In Example 20, the subject matter of Example 9 may optionally include that the non-zero angle may be 90 degrees.

In Example 21, the subject matter of any one of Examples 18 to 20 may optionally include that the first 1-D aperture set may have a first open fraction, which may be a first ratio of the number of holes in the first 1-D aperture set to the total number of pixels in the first 1-D aperture set, and the second 1-D aperture set may have a second open fraction, which may be a second ratio of the number of holes in the second 1-D aperture set to the total number of pixels in the second 1-D aperture set.

In Example 22, the subject matter of Example 21 may optionally include that, to select the coded aperture mask, the method or apparatus may select the first 1-D aperture set so that the first open fraction is closest to the target open fraction, and select the second 1-D aperture set so that the second open fraction is closest to the target open fraction.

In Example 23, the subject matter of any one of Examples 18 to 22 may optionally include that each of the first 1-D aperture set and the second 1-D aperture set may be one of a Singer set, a quadratic residue set, a biquadratic residue set, or an octic residue set.

In Example 24, the subject matter of any one of Examples 18 to 22 may optionally include that each of the first 1-D aperture set and the second 1-D aperture set may be chosen from a family of sets that possess balanced decoders or products of the family of sets unwrapped to make the products 1-dimensional.

A person skilled in the art will appreciate that the terminology used herein is for the purpose of describing various embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A coded aperture mask comprising:
   a 2-dimensional planar substrate having a plurality of holes constructed based on a Cartesian product of a first 1-dimensional aperture set and a second 1-dimensional aperture set,
   wherein the first 1-dimensional aperture set has a first non-unimodular balanced decoder,
   wherein the second 1-dimensional aperture set has a second non-unimodular balanced decoder,
   wherein the Cartesian product involves the first 1-dimensional aperture set and the second 1-dimensional aperture set arranged in a non-zero angle to each other, the first 1-dimensional aperture set defining a first axis of the 2-dimensional planar substrate, the second 1-dimensional aperture set defining a second axis of the 2-dimensional planar substrate, wherein the plurality of holes correspond to holes in both of the first 1-dimensional aperture set and the second 1-dimensional aperture set; and
   wherein a first cyclic, correlation between the first non-unimodular balanced decoder and the first 1-dimensional aperture set has identically zero sidelobes, wherein a second cyclic correlation between the second non-unimodular balanced decoder and the second 1-dimensional aperture set has identically zero sidelobes.

2. The coded aperture mask of claim 1, wherein the first 1-dimensional aperture set has a first open fraction, the first open fraction being a first ratio of a number of holes in the first 1-dimensional aperture set to a total number of pixels in the first 1-dimensional aperture set, wherein the second 1-dimensional aperture set has a second open fraction, the second open fraction being a second ratio of a number of holes in the second 1-dimensional aperture set to a total number of pixels in the second 1-dimensional aperture set.

3. The coded aperture mask of claim 1, wherein each of the first 1-dimensional aperture set and the second 1-dimensional aperture set is one of a Singer set, a quadratic residue set, a biquadratic residue set, or an octic residue set.

4. The coded aperture mask of claim 1, wherein each of the first 1-dimensional aperture set and the second 1-dimensional aperture set is chosen from a family of sets that possess balanced decoders or products of the family of sets unwrapped to make the products 1-dimensional.

5. The coded aperture mask of claim 1, wherein the non-zero angle is 90 degrees.

6. A method of coded aperture imaging, the method comprising:
   receiving an image formed on a detector by radiation passed through a coded aperture mask, the image comprising a plurality of rows and a plurality of columns,
   wherein the coded aperture mask comprises a 2-dimensional planar substrate having a plurality of holes constructed based on a Cartesian product of a first 1-dimensional aperture set and a second 1-dimensional aperture set, wherein the first 1-dimensional aperture set has a first non-unimodular balanced decoder, wherein the second 1-dimensional aperture set has a second non-unimodular balanced decoder; and
   decoding the image based on the first 1-dimensional aperture set and the second 1-dimensional aperture set;
   wherein a first cyclic correlation between the first non-unimodular balanced decoder and the first 1-dimensional aperture set has identically zero sidelobes, wherein a second cyclic correlation between the second non-unimodular balanced decoder and the second 1-dimensional aperture set has identically zero sidelobes.

7. The method of claim 6, wherein the Cartesian product involves the first 1-dimensional aperture set and the second 1-dimensional aperture set arranged in a non-zero angle to each other, the first 1-dimensional aperture set defining a first axis of the 2-dimensional planar substrate, the second 1-dimensional aperture set defining a second axis of the 2-dimensional planar substrate, wherein the plurality of holes correspond to holes in both of the first 1-dimensional aperture set and the second 1-dimensional aperture set, wherein the non-zero angle is 90 degrees.

8. The method of claim 6, wherein the first 1-dimensional aperture set has a first open fraction, the first open fraction being a first ratio of a number of holes in the first 1-dimensional aperture set to a total number of pixels in the first 1-dimensional aperture set, wherein the second 1-dimensional aperture set has a second open fraction, the second open fraction being a second ratio of a number of holes in the second 1-dimensional aperture set to a total number of pixels in the second 1-dimensional aperture set, wherein each of the first open fraction and the second open fraction is adjustable in a range between 0 and 0.5.

9. The method of claim 6, wherein each of the first 1-dimensional aperture set and the second 1-dimensional aperture set is one of a Singer set, a quadratic residue set, a biquadratic residue set, or an octic residue set.

10. The method of claim 6, wherein each of the first 1-dimensional aperture set and the second 1-dimensional aperture set is chosen from a family of sets that possess balanced decoders or products of the family of sets unwrapped to make the products 1-dimensional.

11. The method of claim 6, wherein the decoding of the image comprises:
applying the first balanced decoder to one of the plurality of rows or the plurality of columns; and
applying the second balanced decoder to the other of the plurality of rows or the plurality of columns.

12. The method of claim 6, wherein the decoding of the image comprises:
applying the first 1-dimensional aperture set as a first direct decoder to one of the plurality of rows or the plurality of columns;
applying the second 1-dimensional aperture set as a second direct decoder to the other of the plurality of rows or the plurality of columns to obtain an intermediate decoded image; and
adjusting image pixel brightness of the intermediate decoded image by adding or subtracting from each pixel value a first multiple of a first sum on a first dimension of the intermediate decoded image corresponding to the pixel value, a second multiple of a second sum on a second dimension of the intermediate decoded image corresponding to the pixel value, and a third multiple of a total number of tracks on the detector.

13. A method of coded aperture imaging, the method comprising:
determining a number of pixels in an object being imaged;
calculating a target open fraction based on the number of pixels; and
selecting a coded aperture mask for imaging the object based on the target open fraction:
wherein the coded aperture mask comprises a 2-dimensional planar substrate having a plurality of holes constructed based on a Cartesian product of a first 1-dimensional aperture set and a second 1-dimensional aperture set, wherein the first 1-dimensional aperture set has a first non-unimodular balanced decoder, wherein the second 1-dimensional aperture set has a second non-unimodular balanced decoder, and
wherein a first cyclic correlation between the first non-unimodular balanced decoder and the first 1-dimensional aperture set has identically zero sidelobes, wherein a second cyclic correlation between the second non-unimodular balanced decoder and the second 1-dimensional aperture set has identically zero sidelobes.

14. The method of claim 13, wherein the Cartesian product involves the first 1-dimensional aperture set and the second 1-dimensional aperture set arranged in a non-zero angle to each other, the first 1-dimensional aperture set defining a first axis of the 2-dimensional planar substrate, the second 1-dimensional aperture set defining a second axis of the 2-dimensional planar substrate, wherein the plurality of holes correspond to holes in both of the first 1-dimensional aperture set and the second 1-dimensional aperture set, wherein the non-zero angle is 90 degrees.

15. The method of claim 13, wherein the first 1-dimensional aperture set has a first open fraction, the first open fraction being a first ratio of a number of holes in the first 1-dimensional aperture set to a total number of pixels in the first 1-dimensional aperture set, wherein the second 1-dimensional aperture set has a second open fraction, the second open fraction being a second ratio of a number of holes in the second 1-dimensional aperture set to a total number of pixels in the second 1-dimensional aperture set.

16. The method of claim 15, wherein the selecting of the coded aperture mask comprises:
selecting the first 1-dimensional aperture set so that the first open fraction is closest to the target open fraction; and
selecting the second 1-dimensional aperture set so that the second open fraction is closest to the target open fraction.

17. The method of claim 13, wherein each of the first 1-dimensional aperture set and the second 1-dimensional aperture set is one of a Singer set, a quadratic residue set, a biquadratic residue set, or an octic residue set.

18. The method of claim 13, wherein each of the first 1-dimensional aperture set and the second 1-dimensional aperture set is chosen from a family of sets that possess balanced decoders or products of the family of sets unwrapped to make the products 1-dimensional.

* * * * *